US010671970B2

(12) United States Patent
Notohardjono et al.

(10) Patent No.: US 10,671,970 B2
(45) Date of Patent: *Jun. 2, 2020

(54) ASSIGNING BOXES TO STORAGE BAYS BASED ON AVAILABLE SPACES

(71) Applicant: INTERNATIONAL BUSINESS MACHINES CORPORATION, Armonk, NY (US)

(72) Inventors: Budy D. Notohardjono, Poughkeepsie, NY (US); Arkadiy O. Tsfasman, Wappingers Falls, NY (US); John S. Werner, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 15/797,071

(22) Filed: Oct. 30, 2017

(65) Prior Publication Data

US 2018/0060806 A1 Mar. 1, 2018

Related U.S. Application Data

(63) Continuation of application No. 15/209,937, filed on Jul. 14, 2016, now Pat. No. 10,235,654.

(51) Int. Cl.
G06Q 10/00 (2012.01)
G06Q 10/08 (2012.01)
(Continued)

(52) U.S. Cl.
CPC ....... G06Q 10/087 (2013.01); G06F 16/2358 (2019.01); G06K 7/10009 (2013.01); G06K 7/10861 (2013.01)

(58) Field of Classification Search
CPC .................. H04W 4/00; G06Q 10/08
(Continued)

(56) References Cited

U.S. PATENT DOCUMENTS 3,780,893 A 12/1973 Lassig et al.
3,857,501 A 12/1974 Lassig et al.
(Continued)

FOREIGN PATENT DOCUMENTS

JP       5494730 B2    5/2014
KR  1020150024453 A1   3/2015
WO     2014116235 A1   7/2014

OTHER PUBLICATIONS

Notofiardjono, et al., "Mapping Boxes in a Storage Bay", U.S. Appl. No. 16/212,831, filed Dec. 7, 2018, (64 pages).
(Continued)

Primary Examiner — Oluseye Iwarere
(74) Attorney, Agent, or Firm — Tihon Poltavets, Esq.; Kevin P. Radigan, Esq.; Heslin Rothenberg Farley & Mesiti P.C.

(57) ABSTRACT

Assigning boxes to available spaces in storage bays may include: obtaining a first data structure identifying available spaces in multiple storage bays, the first data structure including xyz measurements of available spaces, and the multiple storage bays including one or more boxes; comparing, by a processor, for match xyz dimensions of a box with xyz dimensions of one or more available spaces in the first data structure to identify a matching available space, the box being selected from a second data structure identifying boxes to be placed into the multiple storage bays; and assigning, based on a match, the box to the matching available space, and removing the box from the second data structure, and the matching available space from the first data structure. The assigning of boxes may be combined (Continued)

with identifying desired products to be ordered, and ordering products based on available spaces in the storage bays.

20 Claims, 28 Drawing Sheets

(51) Int. Cl.
*G06K 7/10* (2006.01)
*G06F 16/23* (2019.01)

(58) Field of Classification Search
USPC .......................... 705/28; 340/932.2; 715/810
See application file for complete search history.

(56) References Cited

U.S. PATENT DOCUMENTS

| | | | |
|---|---|---|---|
| 5,622,010 | A | 4/1997 | Weber |
| 6,550,674 | B1 | 4/2003 | Neumark |
| 6,959,862 | B2 | 11/2005 | Neumark |
| 7,381,022 | B1 | 6/2008 | King |
| 8,175,925 | B1 | 5/2012 | Rouaix |
| 8,494,672 | B2 | 7/2013 | Chimomas |
| 8,624,725 | B1 | 1/2014 | MacGregor |
| 8,831,514 | B2 | 9/2014 | Tysowski |
| 8,976,028 | B2 | 3/2015 | Caporizzo |
| 9,120,621 | B1 * | 9/2015 | Curlander ............ G06Q 10/087 |
| 9,174,800 | B1 * | 11/2015 | Curlander ................ G06K 9/00 |
| 9,262,741 | B1 | 2/2016 | Williams et al. |
| 10,002,342 | B1 * | 6/2018 | Oikarinen ............ G06Q 10/087 |
| 10,148,918 | B1 * | 12/2018 | Seiger .................. G06Q 10/087 |
| 2006/0085295 | A1 | 4/2006 | Droste et al. |
| 2006/0210115 | A1 | 9/2006 | Nemet |
| 2009/0024764 | A1 | 1/2009 | Atherton et al. |
| 2012/0290336 | A1 | 11/2012 | Rosenblatt et al. |
| 2013/0090131 | A1 | 4/2013 | Jalkanen |
| 2014/0077952 | A1 | 3/2014 | Boss et al. |
| 2014/0139347 | A1 | 5/2014 | Foster |
| 2014/0175175 | A1 | 6/2014 | Sun et al. |
| 2014/0213177 | A1 | 7/2014 | Terwilliger et al. |
| 2014/0258930 | A1 * | 9/2014 | Colle .................... G06F 3/0482 |
| | | | 715/810 |
| 2014/0354453 | A1 * | 12/2014 | Fourie .................... G08G 1/144 |
| | | | 340/932.2 |
| 2014/0374474 | A1 | 12/2014 | Huang |
| 2015/0019444 | A1 | 1/2015 | Purves |
| 2015/0253028 | A1 | 9/2015 | Masuyama et al. |
| 2015/0256396 | A1 | 9/2015 | Palmer et al. |
| 2015/0371470 | A1 | 12/2015 | Brown et al. |
| 2016/0027261 | A1 * | 1/2016 | Motoyama ............ G06Q 10/04 |
| | | | 340/313 |
| 2016/0171429 | A1 * | 6/2016 | Schwartz ........... G06K 9/00201 |
| | | | 382/103 |
| 2017/0032311 | A1 * | 2/2017 | Rizzolo ................ G06Q 20/201 |
| 2017/0038325 | A1 | 2/2017 | Takashima |
| 2017/0158430 | A1 | 6/2017 | Raizer |
| 2017/0335562 | A1 | 11/2017 | Hall et al. |
| 2017/0357851 | A1 * | 12/2017 | Segalovitz ......... G06K 9/00442 |
| 2018/0004779 | A1 * | 1/2018 | Moore ............... G06Q 30/0633 |
| 2018/0018622 | A1 * | 1/2018 | Notohardjono .... G06K 7/10009 |

OTHER PUBLICATIONS

Notofiardjono et al., "Second Replacement List of IBM Patent and/or Patent Applications Treated as Related", U.S. Appl. No. 15/797,071, filed Oct. 30, 2017, dated Dec. 7, 2018 (2 pages).
IBM, "zArchitecture Principles of Operation", IBM Publication No. SA22-7832-10, Mar. 2015.
IBM, "Power ISA", Version 2.07B, International Business Machines Corporation, Apr. 9, 2015.
Notohardjono et al., "Locating Electronic Devices in an Electronic Equipment Rack", U.S. Appl. No. 15/076,731, filed Mar. 22, 2016 (64 pages).
Notohardjono et al., "Mapping Boxes in a Storage Bay", U.S. Appl. No. 15/209,916, filed Jul. 14, 2016 (64 pages).
Notohardjono et al., "Locating Electronic Devices in an Electronic Equipment Rack", U.S. Appl. No. 15/164,927, filed May 26, 2016, (63 pages).
Notohardjono, et al., Notice of Allowance for U.S. Appl. No. 15/076,731, filed Mar. 22, 2016, dated Sep. 12, 2016 (9 pages).
Mell et al., "The NIST Definition of Cloud Computing," National Institute of Standards and Technology, U.S Department of Commerce, Special Publication 800-145, Sep. 2011, (7 pages).
Riekki et al., "Touching Nametags with NFC Phones: A Playful Approach to Learning to Read," Transactions on Edutainment X, LNCS 7775, pp. 228-242, 2013 © Springer-Verlag Berlin Heidelberg 2013.
Shafer, S., "A Framework for Creating and Using Maps of Privately Owned Spaces," LoCA 2009, LNCS 5561, pp. 174-191, 2009, © Springer-Verlag Berlin Heidelberg 2009.
Notohardjono et al., Notice of Allowance for U.S. Appl. No. 15/164,927, filed May 26, 2016, dated Nov. 4, 2016 (10 pages).
Notofiardjono et al., Office Action for U.S. Appl. No. 15/076,731, filed Mar. 22, 2016, dated Nov. 9, 2016 (7 pages).
Notohardjono et al., Final Office Action for U.S. Appl. No. 15/076,731, filed Mar. 22, 2016, dated Mar. 2, 2017 (9 pages).
Notohardjono et al., "Assigning Boxes to Storage Bays Based on Available Spaces", U.S. Appl. No. 15/209,937, filed Mar. 22, 2016, (85 pages).
Notohardjono et al., "Mapping Boxes in a Storage Bay", U.S. Appl. No. 15/793,036, filed Oct. 25, 2017 (62 pages).
Notohardjono et al., "List of IBM Patents or Patent Applications Treated as Related", U.S. Appl. No. 15/797,071, filed Oct. 30, 2017, dated Oct. 30, 2017 (2 pages).
Notohardjono et al., Office Action for U.S. Appl. No. 15/793,036, filed Oct. 25, 2017, dated Nov. 15, 2017 (10 pages).
Notofiardjono, et al., "Mapping Boxes in a Storage Bay", U.S. Appl. No. 16/170,242, filed Oct. 25, 2018, (65 pages).
Notohardjono et al., "Replacement List of IBM Patent and/or Patent Applications Treated as Related", US. Appl. No. 15/797,071, filed Oct. 30, 2017, dated Oct. 26, 2018 (2 pages).

* cited by examiner

| SCAN NUMBER | NFC TAGS WITHIN MOBILE DEVICE SCAN RANGE |
|---|---|
| 1 | CORNER 1, CORNER 2, EDGE 1, BOX 1, BOX 2 |
| 2 | CORNER 1, EDGE 1, EDGE 2, BOX 1, BOX 2 |
| 3 | EDGE 1, EDGE 2, EDGE 3, BOX 2 |
| ... | ... |

| SCAN # | MOBILE DEVICE POSITION | NFC TAGS WITHIN MOBILE DEVICES SCAN RANGE |
|---|---|---|
| 1 | (X1, Y1, Z1) | CORNER 1, CORNER 2, EDGE 1, BOX 1 (B1 DISTANCE 1), BOX 2 (B2 DISTANCE 1) |
| 2 | (X2, Y2, Z2) | CORNER 1, EDGE 1, EDGE 2, BOX 1 (B1 DISTANCE 2), BOX 2 (B2 DISTANCE 2) |
| 3 | (X3, Y3, Z3) | EDGE 1, EDGE 2, EDGE 3, BOX 2 (B2 DISTANCE 3) |
| ... | ... | ... |

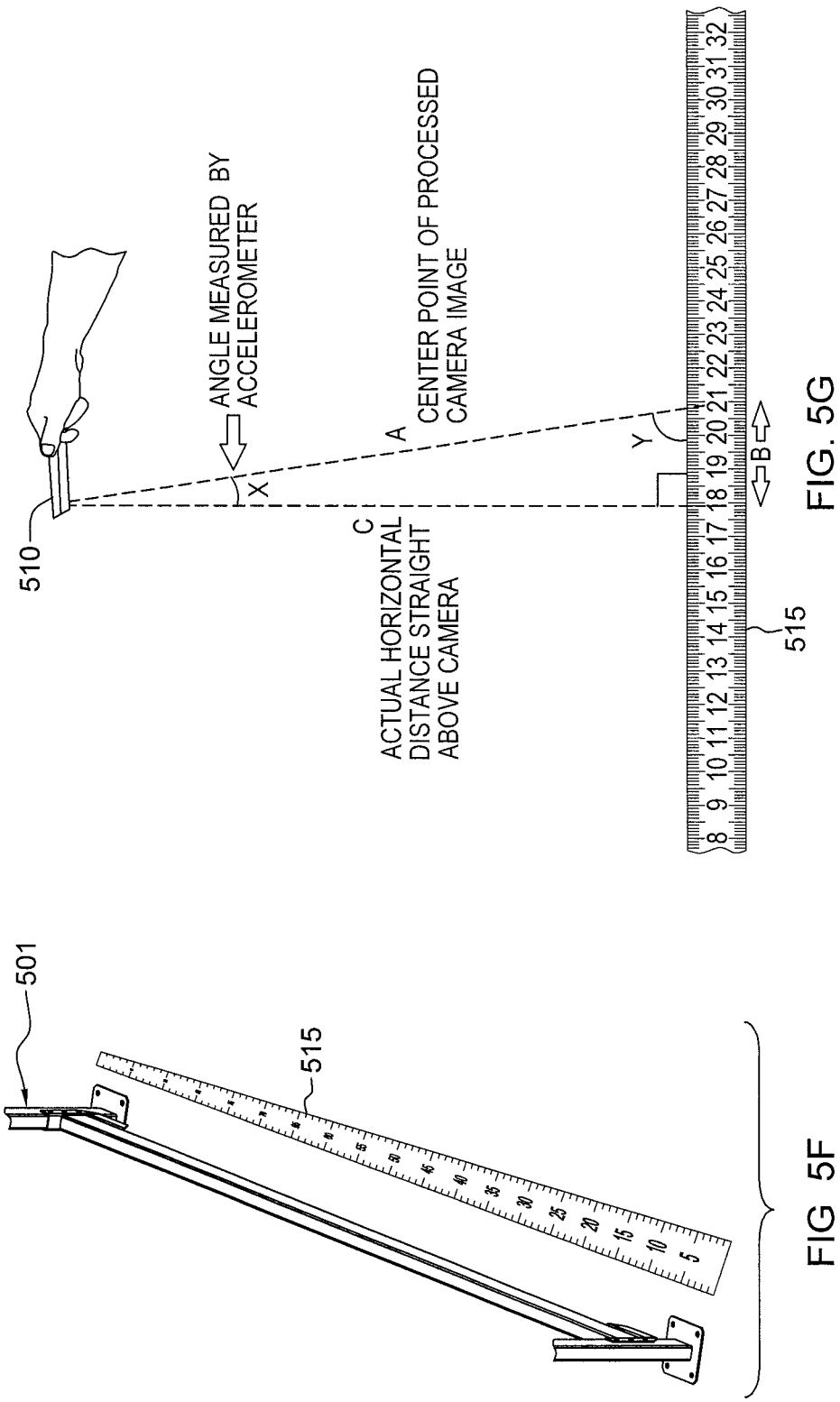

| BOX # | DISTANCE FROM MOBILE DEVICE LOCATION |
|---|---|
| 1 | DISTANCE 1 FROM (X1, Y1, Z1)<br>DISTANCE 2 FROM (X2, Y2, Z2)<br>... |
| 2 | DISTANCE 1 FROM (X1, Y1, Z1)<br>DISTANCE 2 FROM (X2, Y2, Z2)<br>DISTANCE 3 FROM (X3, Y3, Z3)<br>... |
| ... | ... |

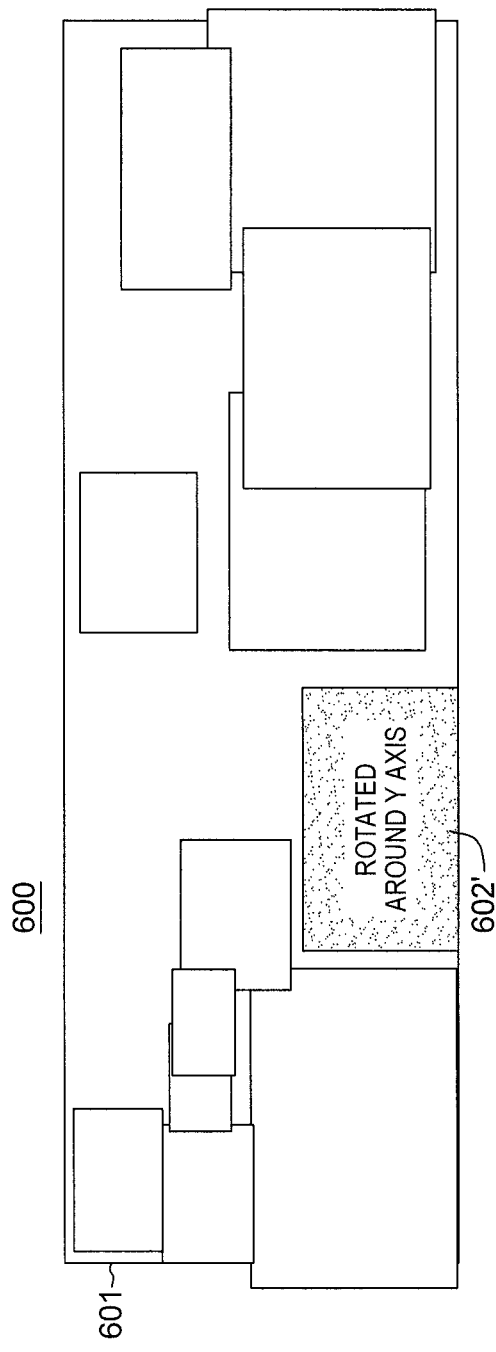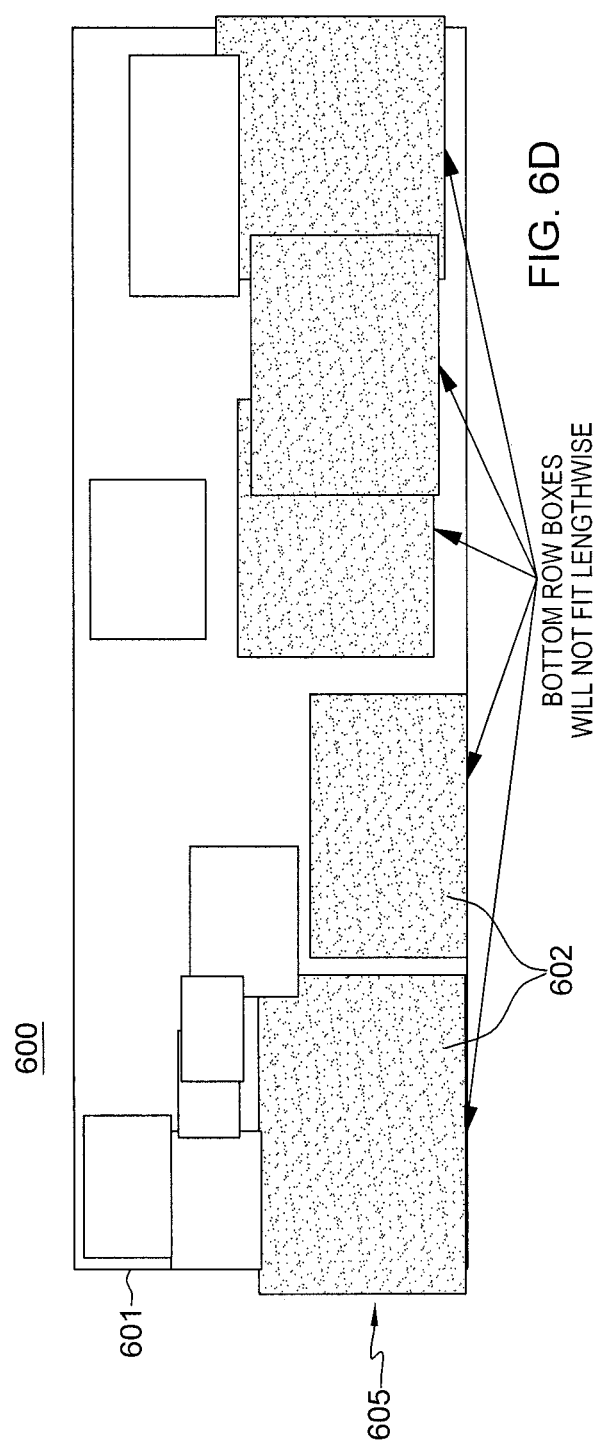

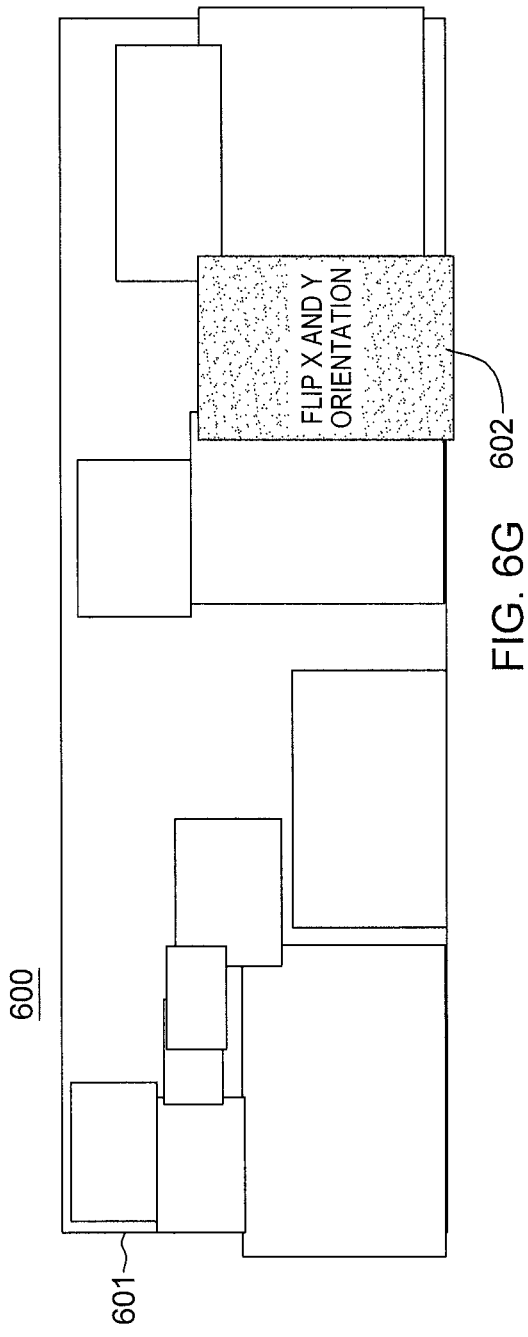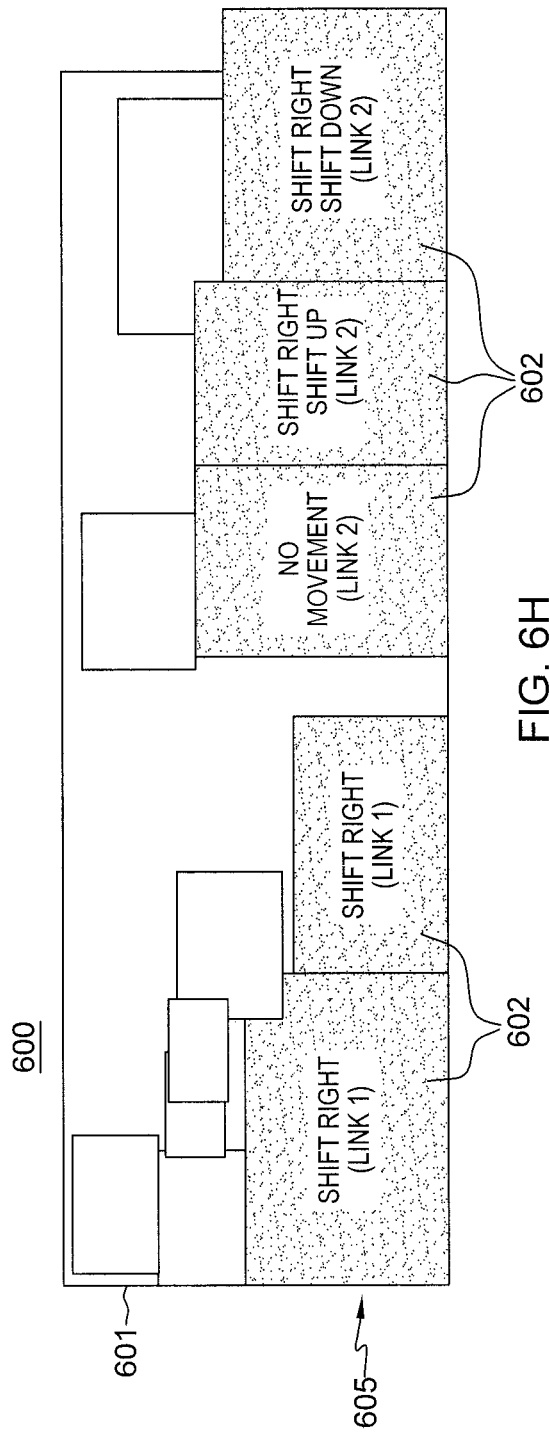

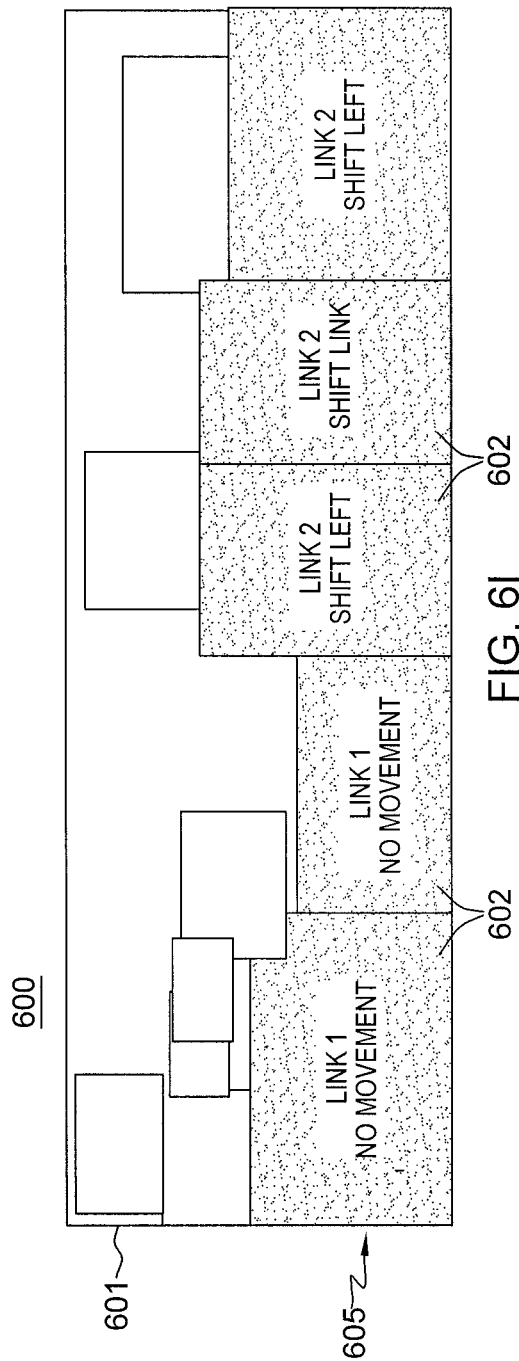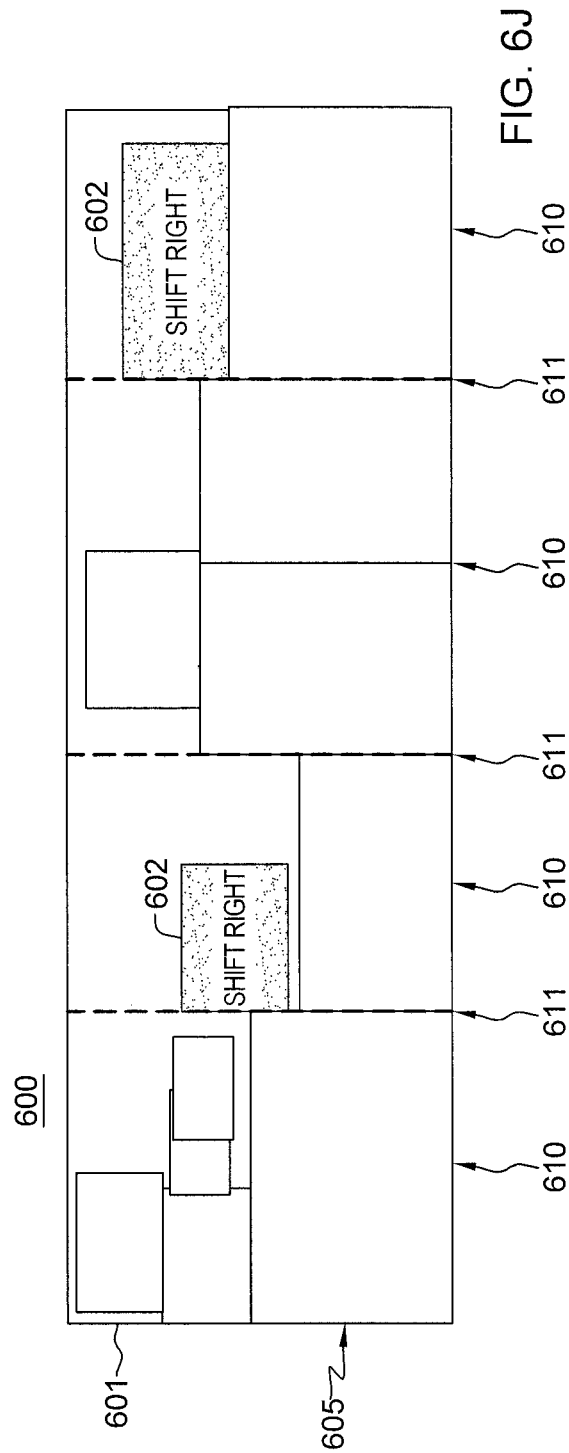

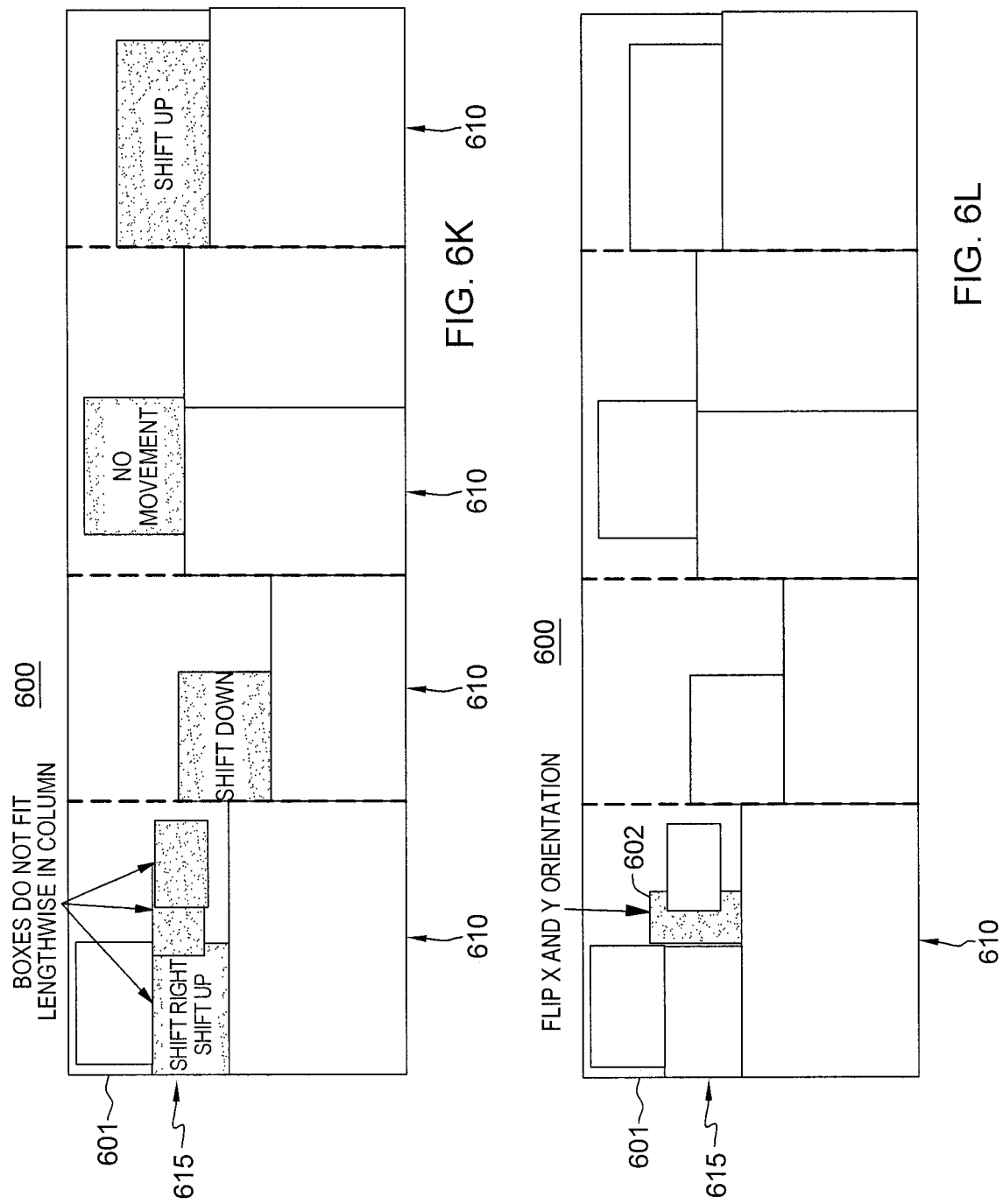

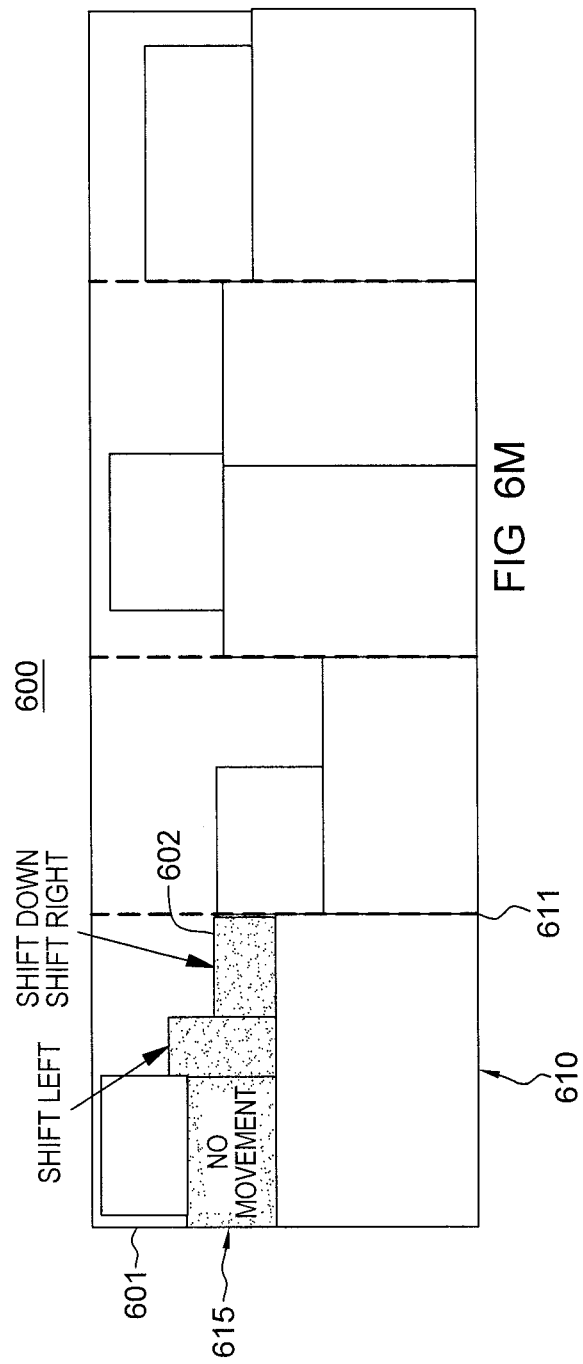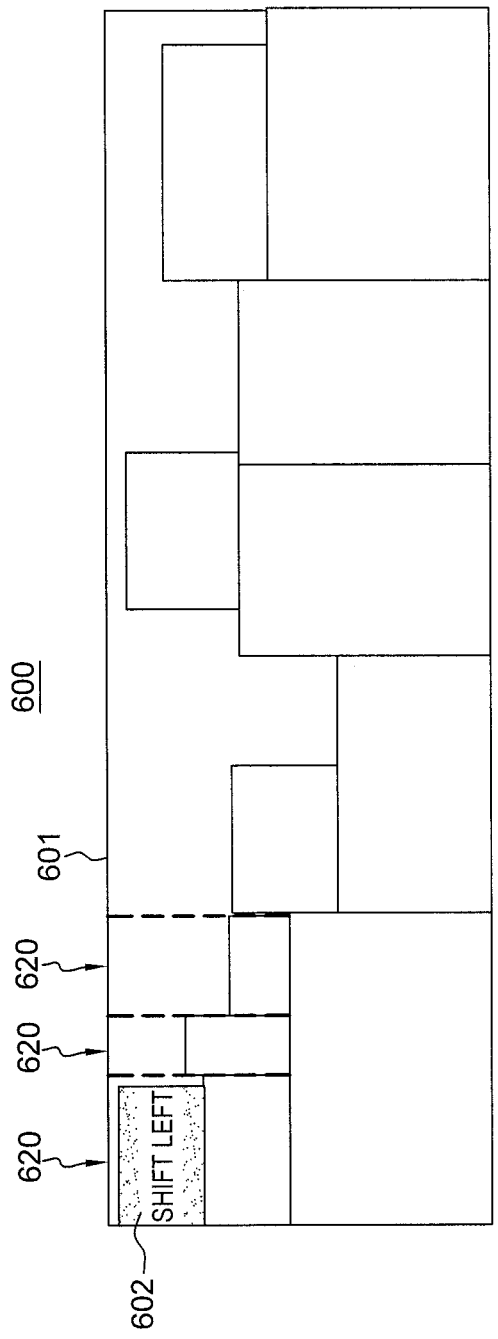

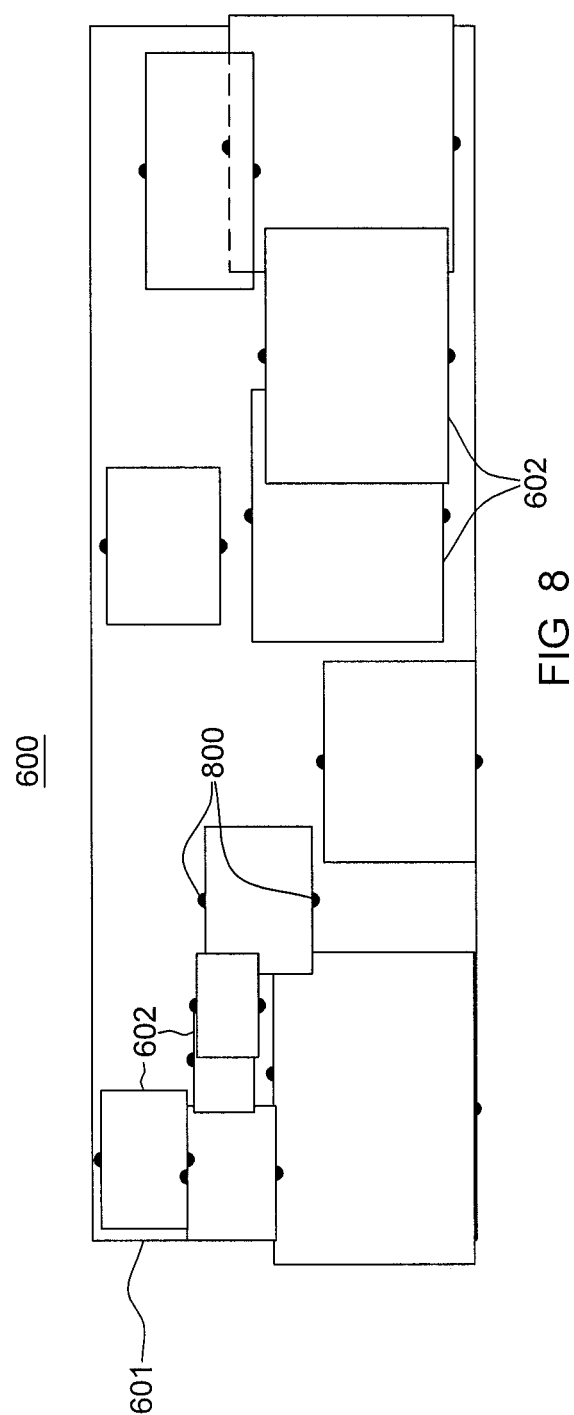

| SUGGESTED REORGANIZE DATA STRUCTURE ||
|---|---|
| KEY | VALUE |
| BOX 1 | BAY 2, BAY 3, BAY 15, BAY 19,... |
| BOX 2 | BAY 1, BAY 3, BAY 12, BAY 14,... |
| . . . | . . . |

FIG. 12B

ASSIGNING BOXES TO STORAGE BAYS BASED ON AVAILABLE SPACES

BACKGROUND

Retail industry warehouses commonly use pallet racks to help organize and locate boxes. The pallet racks may be placed on shelves, commonly called bays, which are marked with a location to help narrow down a search area for a desired box. However, a search still needs to be performed within the identified storage bay. The size of a storage bay can vary depending upon shelf position, but common sizes for bays may, for instance, be between 30-50 ft.$^2$. In practice, when boxes are stacked, bar codes or other identifying stickers may not be on a viewable surface, making it difficult to find a desired box, even when looking in the correct storage bay. Further, as inventory changes, boxes may constantly be moved in and out of one or more storage bays.

SUMMARY

Shortcomings of the prior art are overcome and additional advantages are provided through the provision of a system which includes a memory, and a processor communicatively coupled to the memory. The system performs a method, which includes: obtaining a first data structure identifying available spaces in multiple storage bays, the first data structure including xyz measurements of the available spaces, and the multiple storage bays including one or more boxes; comparing, by the processor, for match xyz dimensions of a box with xyz dimensions of one or more available spaces in the first data structure of available spaces to identify a matching available space, the box being selected from a second data structure identifying boxes to be placed into the multiple storage bays; and assigning, based on a match, the box to the matching available space, and removing the box from the second data structure and the matching available space from the first data structure.

In another aspect, a computer program product is provided for mapping location of boxes in a storage bay. The computer program product includes a computer readable storage medium having program instructions embodied therewith. The program instructions are executable by a processor to cause the processor to: obtain a first data structure identifying available spaces in multiple storage bays, the first data structure including xyz measurements of the available spaces, and the multiple storage bays including one or more boxes; compare, by a processor, for match xyz dimensions of a box with xyz dimensions of one or more available spaces in the first data structure of available spaces to identify a matching available space, the box being selected from a second data structure identifying boxes to be placed into the multiple storage bays; and assign, based on a match, the box to the matching available space, and removing the box from the second data structure and the matching available space from the first data structure.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5F is a partial illustration of a warehouse with a distance scale shown positioned in front of a storage bay having boxes to be mapped, in accordance with one or more aspects of the present invention;

FIG. 5G illustrates another embodiment of a process for identifying location of a mobile device in front of a storage bay, in accordance with one or more aspects of the present invention;

FIG. 8 depicts an alternate embodiment of an initial scan of a storage bay with multiple boxes, each having multiple NFC tags associated therewith, in accordance with one or more aspects of the present invention;

FIG. 12B depicts one embodiment of a data structure obtained from the processing of FIG. 12A, in accordance with one or more aspects of the present invention;

DETAILED DESCRIPTION

Figure 1:
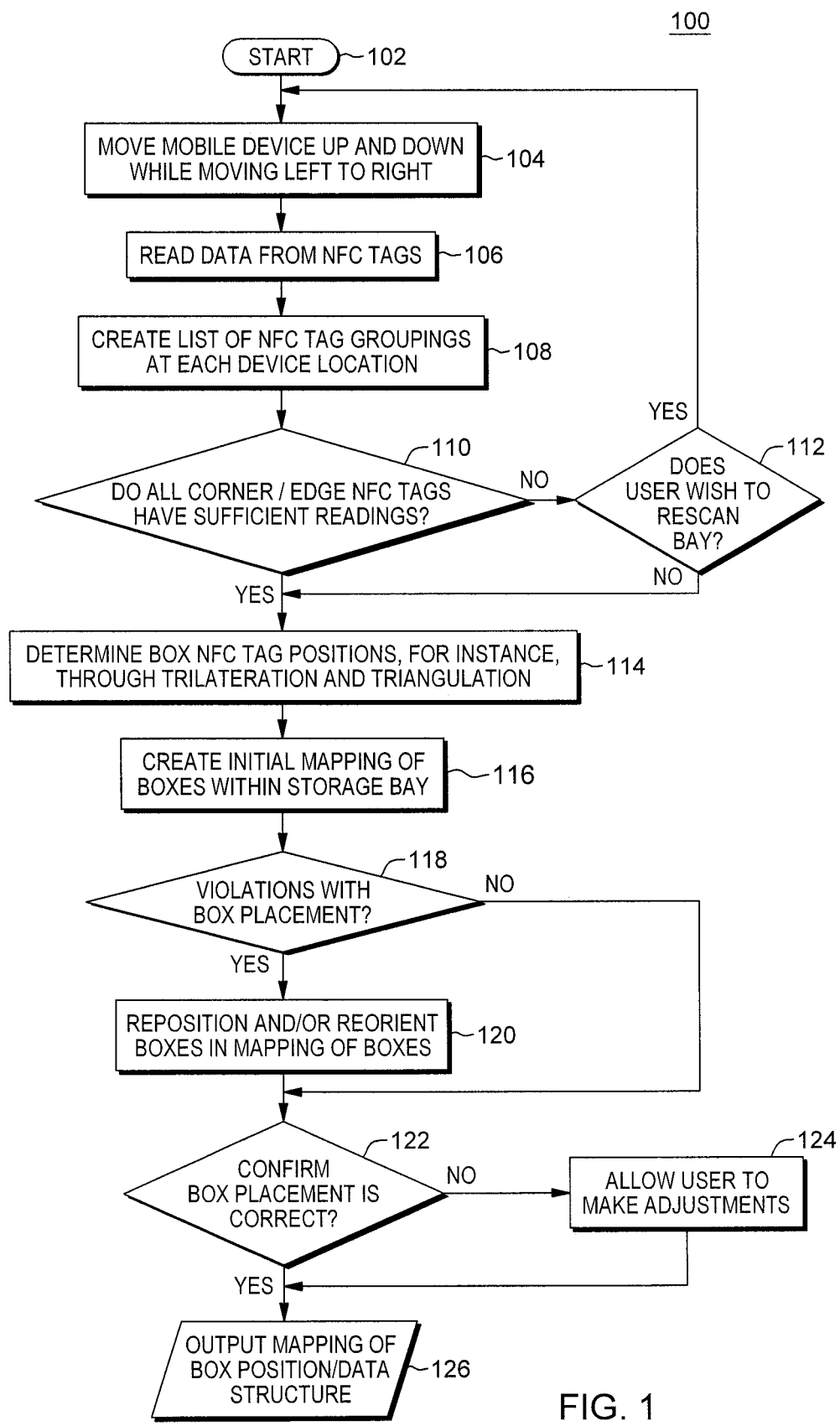
FIG. 1 depicts one embodiment of a process of mapping boxes in a storage bay, in accordance with one or more aspects of the present invention.

As noted, boxes are oftentimes stored in storage bays within a warehouse. The size of a storage bay can vary depending, for instance, upon shelf position, but common sizes for bays may be between 30-50 ft.$^2$. In practice, when boxes are stacked, bar codes or other identifying stickers may not be on a viewable surface, making it difficult to find a desired box, even when looking in the correct storage bay. Also, as inventory changes, boxes may be moved in or out of a storage bay, further complicating locating of the boxes.

Disclosed herein (in one or more aspects) are methods, systems, and computer program products which facilitate mapping boxes within a storage bay using, for instance, a mobile device and wireless communication tags, such as near-field communication (NFC) tags. In addition, disclosed herein, in one or more other aspects, are methods, systems, and computer program products which facilitate assigning boxes to storage bays based on available spaces within the storage bays. Further, the disclosed processes for assigning boxes to storage bays may be linked with, for instance, ordering of new inventory, to ensure that any ordered inventory can be accommodated within the storage bays of a store room or warehouse, in accordance with one or more other aspects of the present invention. In addition, the disclosed processes for automatically assigning boxes to storage bays may be integrated with, or used in association with, a process for generating a data structure identifying boxes without an available space in the multiple storage bays, and for each box in the data structure, an identification of one or more storage bays which could be reorganized to provide space for that box.

In still further aspects, methods, systems, and computer program products are provided (in accordance with one or more aspects of the present invention) to facilitate prompt reorganization of the storage bays within a warehouse to more efficiently make use of available spaces, such as, for instance, to advise an operator of a warehouse that one or more boxes from one or more other bays may be "perfect fits" for one or more available spaces within a particular storage bay, and thereby facilitate more efficient use of available spaces across the storage bays.

Mapping of boxes within storage bays is initially described below with reference to FIGS. 1-9. Those skilled in the art should note, however, that the assigning of boxes to storage bays based on available spaces may be used in combination with any approach to establishing a data structure of available spaces within the storage bays, including the xyz measurements of each available space. Note that, in one or more embodiments, an available space refers to an available rectangular space within a storage bay determined, for instance, from the bottom of the storage bay or from the top surface of an already-placed box in the storage bay. If determined from the top surface of an already-placed box, the available space may have a depth in the z dimension equal to the depth of an already-placed box within a set tolerance. For instance, in one particular example, the set tolerance might be within ±10%.

As is known, NFC tags employ a set of communication protocols that enable an electronic device, such as a mobile device, to establish communication by bringing the device and tag within a set distance of each other. For instance, in one or more implementations, NFC tags may operate at a frequency of 13.56 MHz, and have a read distance of 1-1.5 meters (ISO/IEC 15693), or less. Current NFC tags may have a maximum memory size of about 8 kB, and a maximum transfer rate of about 424 kB/s for reading or writing. Many mobile devices available today already include NFC technology, which may be used in different settings to transfer information. For instance, in a retail environment, NFC communications may be employed between devices to, for example, pay by credit card, receive credit for a loyalty program, receive coupons, etc.

Note that although described hereinbelow with reference to NFC communications and NFC tags, near-field communication protocols are one example only of a short-range wireless communication protocol which may be employed to implement mapping of boxes in a storage bay, in accordance with one or more aspects of the present invention. Those skilled in the art will understand that other short-range wireless communication protocols could alternatively be employed, such as Bluetooth communications, short-range Wi-Fi, radio frequency identification (RFID), etc. Also, if desired, a mobile device may be customized to use a particular wireless communication protocol, such as RFID communication. Further, a wireless reader, such as a mobile device, is an example of one device of many that may be employed to ascertain the desired identifying information for mapping boxes in the storage bay, as described below.

Before further discussing implementing a mapping process in accordance with one or more aspects of the present invention, mobile devices are briefly described. By way of example, in one or more embodiments, a mobile device may have a wireless communication capability, and be, for instance, a mobile phone, a personal digital assistant (PDA), a wireless computer, a laptop computer, tablet, etc. The wireless communication capability or system may be, for instance, a Code Division Multiple Access (CDMA) system, a Global System for Mobile Communication (GSM), a Wideband CDMA (W-CDMA) system, a Long-Term Evolution (LTE) system, an LTE Advanced system, etc.

The mobile device may be capable of providing bidirectional communication via a receive path and a transmit path. On the receive path, signals transmitted by another device or tag may be received by an antenna, and provided to a receiver. The receiver conditions and digitizes the receive signals, and provides the conditioned and digitized signals to a digital section of the mobile device for further processing. On a transmit path, a transmitter may receive data to be transmitted from the digital section, and process and condition the data, and generate a modulated signal, which may be transmitted via the antenna to one or more base stations. The receiver and the transmitter are part of the transceiver, and support, for instance, CDMA, GSM, W-CDMA, LTE, LTE Advanced, etc.

The digital section of the mobile device may include various processing, interfaces, and memory units, such as, for example, a modem processor, a reduced instruction set computer/digital signal processor (RISC/DSP), a controller/processor, an internal memory, a generalized audio encoder, a generalized audio decoder, a graphics/display processor, and/or an external bus interface (EBI). The modem processor may perform processing for data transmission and reception, for example, encoding, modulation, demodulation, and decoding. The RISC/DSP may perform general and specialized processing for the wireless device. The controller/processor may control the operation of various processing and interface units within the digital section. The internal memory stores data and/or instructions for various units within the digital section.

A generalized audio encoder performs encoding for input signals from an audio source, a microphone, etc. A generalized audio decoder performs decoding for coded audio data and provides output signals to, for instance, a speaker/headset. It should be noted that the generalized audio encoder and the generalized audio decoder are not necessarily required for interface with the audio source, the microphone, and speaker/headset, and thus, may not be part of the mobile device. The graphics/display processor performs processing for graphics, videos, images, and texts, which are presented to a display unit. The EBI facilitates the transfer of data between the digital section and a main memory. The digital section may be implemented with one or more processors, DSPs, microprocessors, RISCs, etc. The digital section may also be fabricated on one or more application-specific integrated circuits (ASICs), and/or other types of integrated circuits (ICs).

In general, a mobile device such as described herein is indicative of various types of devices, such as a wireless phone, a cellular phone, a laptop computer, a wireless multimedia device, a tablet, a wireless communication personal computer (PC), a PDA, etc. Any mobile device such as referenced herein may have memory for storing instructions and data, as well as hardware, software, and firmware, and combinations thereof.

In one or more aspects, mapping location of boxes in a storage bay such as disclosed herein advantageously allows for boxes, or products within the boxes, to be readily tracked within a warehouse. In one or more implementations, the mapping may include: ascertaining storage bay boundaries, including location of corners and edges of the storage bay; reading, using a mobile device, identifying information from tags associated with the boxes, each box having at least one tag associated therewith; and determining position of the tags in the storage bay by triangulating tag locations relative to, in part, one or more locations of the mobile device; and creating, by a processor, a mapping of boxes in the storage bay using, at least in part, the tag positions and the identifying information wirelessly read from the tags.

In one or more embodiments, the mobile device and tags communicate via the near-field communication (NFC) protocols with, for instance, the tags being passive NFC tags scanned by the mobile device. Further, in one or more implementations, the wirelessly reading may include wirelessly reading, using the mobile device, the identifying information from the tags associated with the boxes multiple times from different locations of the mobile device, and the determining may include using the multiple readings in triangulating tag locations within the storage bay.

In one or more embodiments, ascertaining storage bay boundaries may include providing boundary tags at corners and along edges of the storage bay, and wirelessly scanning the boundary tags affixed to the corners and along the edges of the storage bay to ascertain the storage bay boundaries. With this approach, the mapping may further include determining a current location of the mobile device by trilateration based, at least in part, on measured distances between the mobile device and at least three boundary tags affixed to the storage bay boundary, the determining of the current location facilitating the automatically determining position of the tags in the storage bay.

In one or more implementations, boxes within a particular storage bay may be of the same size, or of different sizes, and may be oriented the same or differently, due to initial placement within the storage bay, or movement or repositioning of one or more boxes within the storage bay. Once the tag locations are triangulated within the storage bay, a process is provided for automatically creating a mapping of boxes by shifting and reorienting representations of the boxes based on the identifying information and the tag positions. As noted, a complicating factor in this process is that the boxes may be of different shapes and/or sizes, and can be placed anywhere within the storage bay, in any orientation.

In one or more implementations, the creating may include automatically reorienting a floating box in the mapping of boxes in the storage bay. Note that as used herein, reference to a box in the mapping of boxes refers to a representation of a box in the mapping of boxes, such as in a data structure or in the display of the mapping of boxes. Also, the creating may initially orient each box in the mapping of the storage bay so that the box's largest dimension is into the storage bay, and so that a second largest dimension of the box is oriented horizontally within the storage bay mapping. Alternatively, in one or more further embodiments, the identifying information read from the tags may include orientation-related information, such as if the associated box should be retained in a specific orientation (for instance, the box may contain glassware, and should not be placed on a side), or the content of the box is breakable, and nothing should be stacked on top of the associated box. The creating the mapping of boxes may incorporate or consider this identifying information in determining whether to potentially reorient or reposition a box, if desired.

In one or more implementations, the creating the mapping of boxes may further include automatically repositioning boxes in a row of boxes in the mapping of boxes when boxes overlap, or a box overlaps an edge of the storage bay boundary. The automatically repositioning may include, for instance, for a bottom row of boxes in the mapping of boxes, automatically aligning boxes in the bottom row of boxes to a bottom edge of the storage bay. Further, the automatically repositioning may include automatically moving a representation of a box overlapping a side edge of the storage bay inward into the storage bay boundary of the mapping.

In one or more embodiments, the automatically repositioning of one or more boxes within the mapping of boxes in the storage bay may include, on a first pass through the row of boxes, automatically shifting a box of two adjacent, overlapping boxes to remove the overlap, and automatically creating a linked box group including the two adjacent boxes, and on a second pass through the row of boxes, moving the linked box group together should the linked box group overlap an edge of the bay boundary, or overlap another box in the row of boxes.

The creating the mapping of boxes in the storage bay may further include dividing the storage bay into multiple vertical sub-bays extending above a lower low of boxes in the mapping of boxes, each vertical sub-bay having at least one edge aligned to an edge of a box in the lower row of boxes, and then repeating the automatically reorienting and the automatically repositioning for boxes in each vertical sub-bay of the multiple vertical sub-bays in a next row of boxes in the mapping of boxes. In this process, adjacent boxes in the lower row of boxes in the mapping of boxes with a same height may be part of a same vertical sub-bay of the multiple vertical sub-bays.

If desired, the obtained mapping of boxes may be user-adjusted by, for instance, displaying the mapping of boxes to a user and allowing the user to make adjustments to the mapping of boxes by interactively reorienting or repositioning one or more boxes in the mapping of boxes based, for instance, on a visual inspection of the actual placement and orientation of boxes within the storage bay of the warehouse.

Reference is made below to the drawings, which may not be drawn to scale for ease of understanding, and wherein the same reference numbers used throughout different figures designate the same or similar components.

FIG. 1 depicts one high-level embodiment of a process, generally denoted 100, for mapping boxes in a storage bay, in accordance with one or more aspects of the present invention. In one or more embodiments, it is assumed that every box in the storage bay has at least one associated NFC tag, such as a passive NFC tag. For instance, in one or more implementations, the NFC tags may either accompany, or be used in place of, standard UPC tags, and may be located on an outer surface of the associated box, or even within the box. Further, the tags may contain information on what the product is within the box, the number of items in the associated box, the size or physical dimensions of the box, etc. This information is generally referred to as identifying information, and the tag may also contain other detailed information about the product or box, if desired.

As noted, in one or more embodiments, the corners and edges of the storage bay may also be marked with NFC tags to assist in ascertaining the bay boundaries. By way of example, these tags may contain information on the size of the bay, the location of the specific NFC tag on the bay, the bay's physical location within the warehouse, etc. NFC tags could also be placed inside the bay and in the back of the bay for greater accuracy in identifying the storage bay boundaries, if desired. In one or more other embodiments, storage bay boundaries could be predetermined and mapped so as to be readily available to the box mapping process, as will be understood by those skilled in the art.

Referring to FIG. 1, to start 102, in one or more implementations, a user may wave a mobile device up and down, and in and out, while moving, for instance, from side-to-side in front of a storage bay in order to scan NFC tags associated with boxes within the storage bay, as well as NFC tags associated with the boundaries of the storage bay 104. A user may move the mobile device around or in close proximity to the boxes, covering the entire area of the bay. The mobile device detects the NFC tags along the way, which contain information about the storage bay or the associated boxes. If desired, movement instructions could be given on the mobile device. Further, notifications via sound or vibration could also be provided to, for instance, notify the user if they are moving the mobile device too quickly, which may be based on accelerometer readings, or if they have missed scanning part of the bay. One or more additional passes over the bay may help to improve accuracy, if desired. A checksum could be used during scanning to ensure that a complete transmission is received from a particular tag. A user may also be given the ability to update the tag information for, for instance, quantity of items within a particular box.

Figures 5A, 5B:
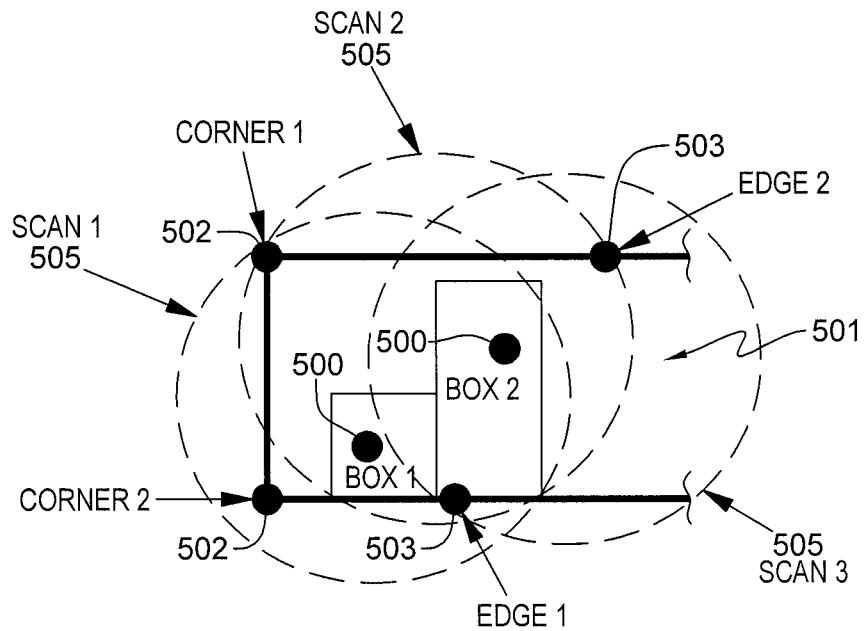
FIG. 5A is a schematic of one embodiment of a mobile device search for near-field communication (NFC) tags in a proximity sphere or scan range about the mobile device, in accordance with one or more aspects of the present invention.
FIG. 5B depicts an example data structure listing identified NFC tags within each mobile device proximity sphere, in accordance with one or more aspects of the present invention.

The mobile device reads data from the NFC tags within its scan range 106. An example of reading data from the NFC tags 106 (FIG. 1) is depicted in FIG. 5A, where a mobile device (not shown) includes a proximity sphere or scan range 505 about the mobile device, within which NFC tags 500 associated with boxes (box 1, box 2, etc.) are identified within a storage bay 501, as well as NFC tags 502 associated with corners of storage bay 501, and NFC tags 503 disposed along the edges of storage bay 501. The mobile device, which in this example, functions as an NFC reader, searches for NFC tags within the proximity sphere or scan range 505 of the mobile device.

Returning to FIG. 1, a list of NFC tag groupings is created at each mobile device location 108. One embodiment of such a list is depicted in FIG. 5B for the three scans of FIG. 5A. Note that placement of the NFC tags 502 (FIG. 5A) at the corners, and NFC tags 503 (FIG. 5A) along the edges, for instance, every two feet along the edges, may advantageously facilitate locating tags 500 within storage bay 501, as explained further below. In one or more implementations, the presence of the corner/edge tags 502, 503 and knowing their distance apart may facilitate the processing described below. For instance, in one or more embodiments, the mobile device may be required to read at least three corner and/or edge tags (which are at known locations and distances apart) at each scan location of the mobile device in order to facilitate trilateration of the mobile device, and thus triangulation of the tags 500 associated with the boxes within storage bay 501 (FIG. 5A).

Returning to FIG. 1, processing determines whether there are sufficient corner and/or edge NFC tag readings 110. If "no", processing inquires whether the user wishes to rescan the storage bay 112. If "yes", then the process flow returns to scanning the NFC tags within or associated with the storage bay 104. If "no", or if there are sufficient readings of the corner and edge tags, then processing proceeds to determine the NFC tag positions associated with the boxes through, in one or more implementations, trilateration of the mobile device and triangulation of the NFC tags 114.

Figure 5C:
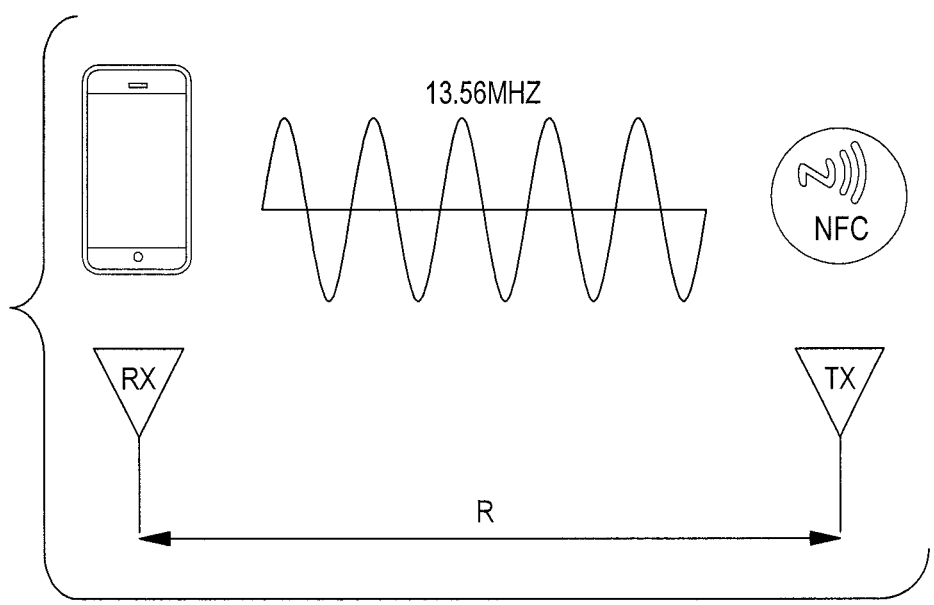
FIG. 5C illustrates communication between a mobile device and an NFC tag, including determination of distance between the mobile device and NFC tag, which may be used in a process in accordance with one or more aspects of the present invention.

As noted, the mobile device determines NFC tags within its read range at each position, as the mobile device is moved across the storage bay. The mobile device may determine distances between the device and each NFC tag. As illustrated in FIG. 5C, a mobile device may transmit at, for instance, 13.56 MHz, to a passive NFC tag. The passive NFC tag powers up before transmitting its data back to the mobile device, also at 13.56 MHz. The distance between the mobile device and a single NFC tag can be calculated using Friis transmission equation on the return signal from the passive NFC tag to the mobile device. In particular, the distance R may be determined as:

$$R = \frac{\lambda}{4\pi\sqrt{\frac{P_t}{P_r G_t G_r}}} \quad (1)$$

Wherein:
 λ=Wavelength (22.12 m for NFC);
 $P_t$=Power transmitted (NFC tag);
 $P_r$=Power received (mobile device);
 $G_t$=Gain of transmitting antenna (NFC tag);
 $G_r$=Gain of receiving antenna (mobile device); and
 R=Distance.

Based on known distances between the corner and edge NFC tags 502, 503 (FIG. 5D), and the distance of the mobile device from NFC tags 502, 503, the exact position of the mobile device may be determined via trilateration. To facilitate the trilateration determination, for the sensed position being analyzed, the mobile device should be within range of at least three NFC tags associated with the bay boundary. In scan 1 in the example of FIG. 5A, the mobile device is within range of two corner tags 502, one edge tag 503, and one box tag 500. A determination is made of the distance to each of the four tags from the mobile device at that moment in time, and from that information, the exact position of the mobile device may be determined relative to the edge of the storage bay with NFC tags 502, 503.

Figures 5D, 5E:
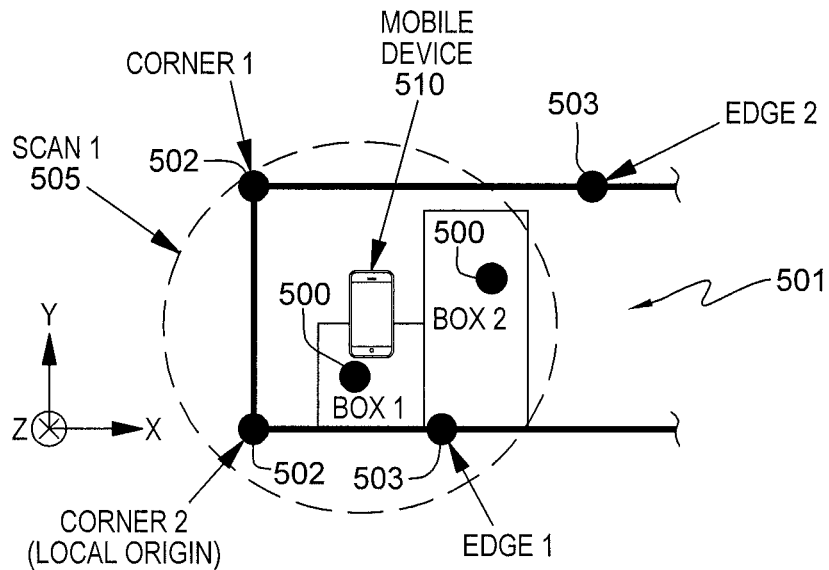
FIG. 5D illustrates an example trilateration of a location of the mobile device using known positions of NFC tags at the corners or edges of the storage bay, in accordance with one or more aspects of the present invention.
FIG. 5E depicts an example data structure obtained during NFC tag trilateration, in accordance with one or more aspects of the present invention.

For instance, with reference to FIG. 5D, the height of the mobile device 510 may be determined by knowing the length of the three sides of a triangle formed between corner tags 502 and mobile device 510, with the height being ascertained, for instance, relative to the lower edge of storage bay 501. It is assumed that the height of the lower edge of the storage bay relative to, for instance, a warehouse floor, could also be known. With the height information, the horizontal distance of mobile device 510 along storage bay 501 may be determined by using, for instance, tag 502 in corner 2 of the storage bay, and edge tag 503. The distance between corner and edge tags 502, 503 is known, and the distance between the mobile device and these tags can be determined using Friis' Equation (1) above. By knowing the length of the three sides of the imaginary triangle, and using the law of cosines, the distance of the mobile device from, for instance, the left-bay edge, may be determined using simple trigonometry. Further, the distance of the mobile device from the storage bay may be determined similarly using trigonometry, with the Pythagorean Theorem being used to calculate one of the unknown sides of the triangle between, for instance, the z direction of mobile device 510 relative to, for instance, location of NFC tag 502 in corner 2. In one or more implementations, the law of cosines could be used to calculate the distance z between the mobile device and the storage bay. FIG. 5E depicts one embodiment of a data structure obtained from mobile device trilateration identifying the position of the mobile device at each set of scan data, along with identifying the NFC tags within the proximity sphere or scan range at that location.

Note that other embodiments could be employed in determining position of the mobile device. For instance, FIGS. 5F & 5G depict one embodiment where the position of mobile device 510 at one side of the storage bay is ascertained using, in part, a distance scale or ruler and a camera associated with mobile device 510. By facing the camera towards the warehouse floor, the camera can be used to determine mobile device height. Cameras typically measure distances of items with autofocus, so the feature is already readily available on most mobile devices. Also, applications already exist in the art to determine height using this feature. In addition, using the camera, image processing could be performed to view distance scale 515 disposed, for instance, on the floor in the front of the storage bay. Mobile device 510 may also include a built-in accelerometer to determine if a user is tilting the device in any direction. In practice, a user would most likely not hold the mobile device parallel to the floor at all times during the scan process. Simple trigonometry may be used to determine the mobile device's horizontal distance within the storage bay, as illustrated in FIG. 5G. This process may be employed to determine the mobile device's exact position at an instance of time, replacing the need for corner and edge tags to find the mobile device position relative to the bay, as explained above. At the same instance of time, the mobile device to NFC box tag location may be obtained using Friis' Equation (1). By way of further example, the mobile device could be attached to a movable structure which holds the mobile device at a fixed height, for instance, in front of the storage bay, during the scan process, thereby simplifying locating of the mobile device relative to the boxes.

Figures 5H, 5I:
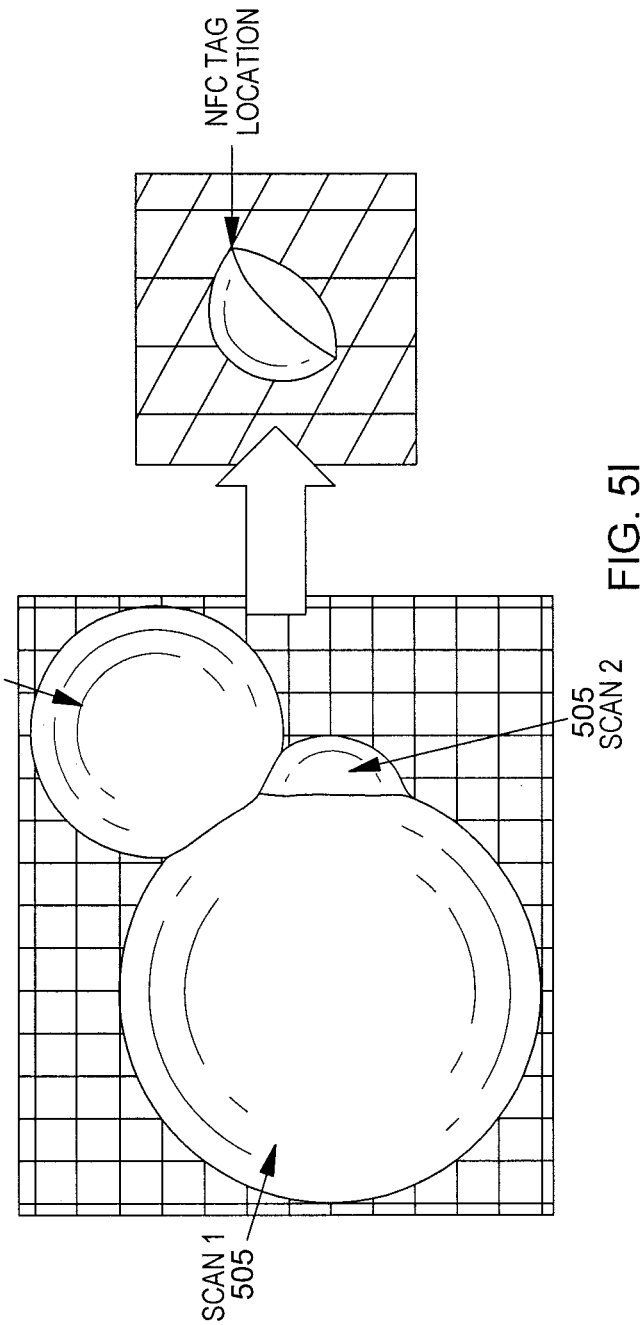
FIG. 5H depicts an example data structure for NFC tag triangulation using the known location of the mobile device, in accordance with one or more aspects of the present invention.
FIG. 5I illustrates one embodiment of NFC tag triangulation using proximity spheres representative of different mobile device positions in space relative to the NFC tag at issue, and with the NFC tag being located at the intersection of the multiple spheres, in accordance with one or more aspects of the present invention.

Once the location of the mobile device is known, NFC tag triangulation may be performed to ascertain position of the NFC tags associated with the boxes. As noted, Friis' Equation (1) may be used to determine the distance to the NFC box tag at this instance of time, but the mobile device does not know which direction the box is in. To resolve this, a proximity sphere or scan range about the mobile device may be created in this instance in time, with a radius equal to a distance between the mobile device and the NFC box tag. An embodiment of a data structure containing this information is illustrated in FIG. 5H, with example proximity spheres 505 depicted in FIG. 5I. Each sphere 505 in FIG. 5I represents the mobile device's position in space with, for instance, the mobile device being located at the center of the sphere. The radius of each sphere matches a distance between the measurements to a unique NFC tag at the time the mobile device was at that position. More spheres may be created for greater accuracy. By using the data from at least three instances of time, that is, three different overlapping spheres 505, such as depicted in FIG. 5I, the exact position of the NFC tag within the storage bay can be triangulated. If two points satisfy this criteria, for instance, one in front of the mobile device, and one behind, then the tag location is determined as the one falling within the storage bay.

Returning to FIG. 1, once the NFC tag positions associated with the boxes within the storage bay are determined 114, then processing creates a mapping of boxes within the storage bay 116. As noted, the mapping of boxes refers to, for instance, a data structure or displayable representation of the boxes within the storage bay. Since the location of the NFC tag on the associated box may vary from box-to-box, and since the boxes may be of different shapes and/or sizes, and orientations, the representation of the mapping of boxes undergoes further processing, as explained below.

Figure 2:
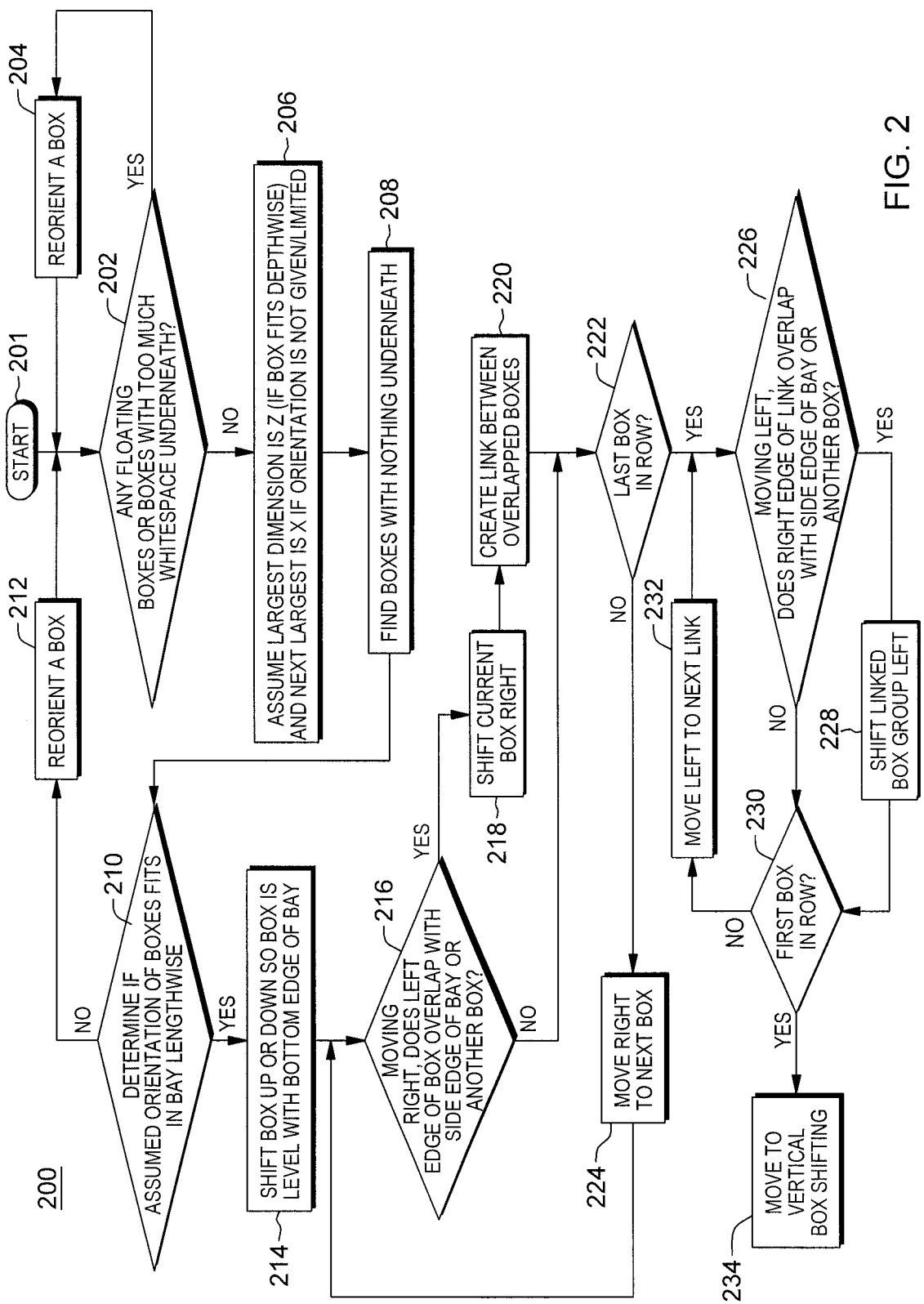
FIG. 2 depicts one embodiment of a process of horizontally-repositioning representations of boxes in a storage bay where an overlap is detected during the mapping, in accordance with one or more aspects of the present invention.
Figure 3:
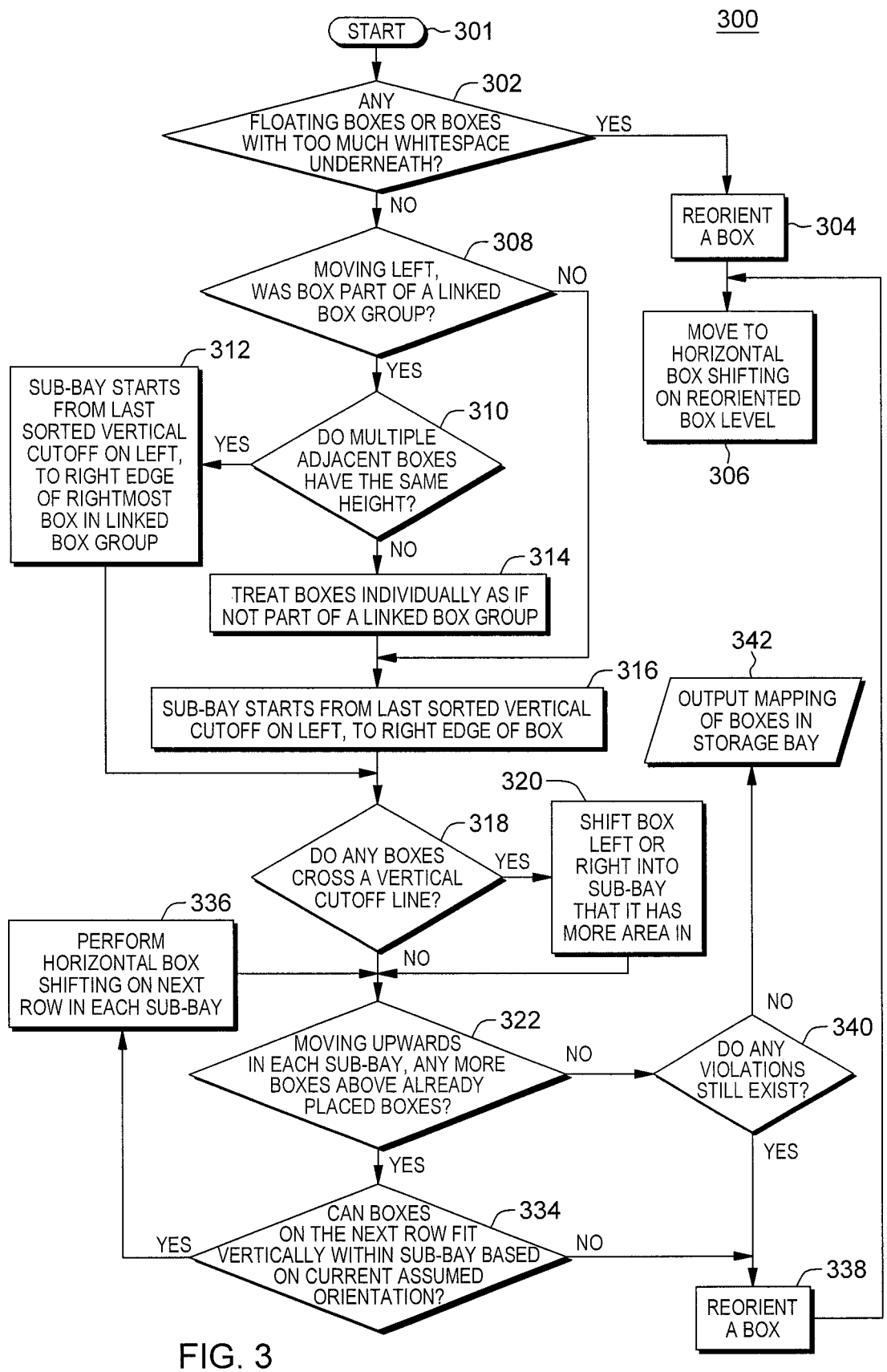
FIG. 3 depicts one embodiment of a process of vertically-repositioning representations of boxes in a storage bay where an overlap is detected and/or box reorientation desired, in accordance with one or more aspects of the present invention.
Figure 4:
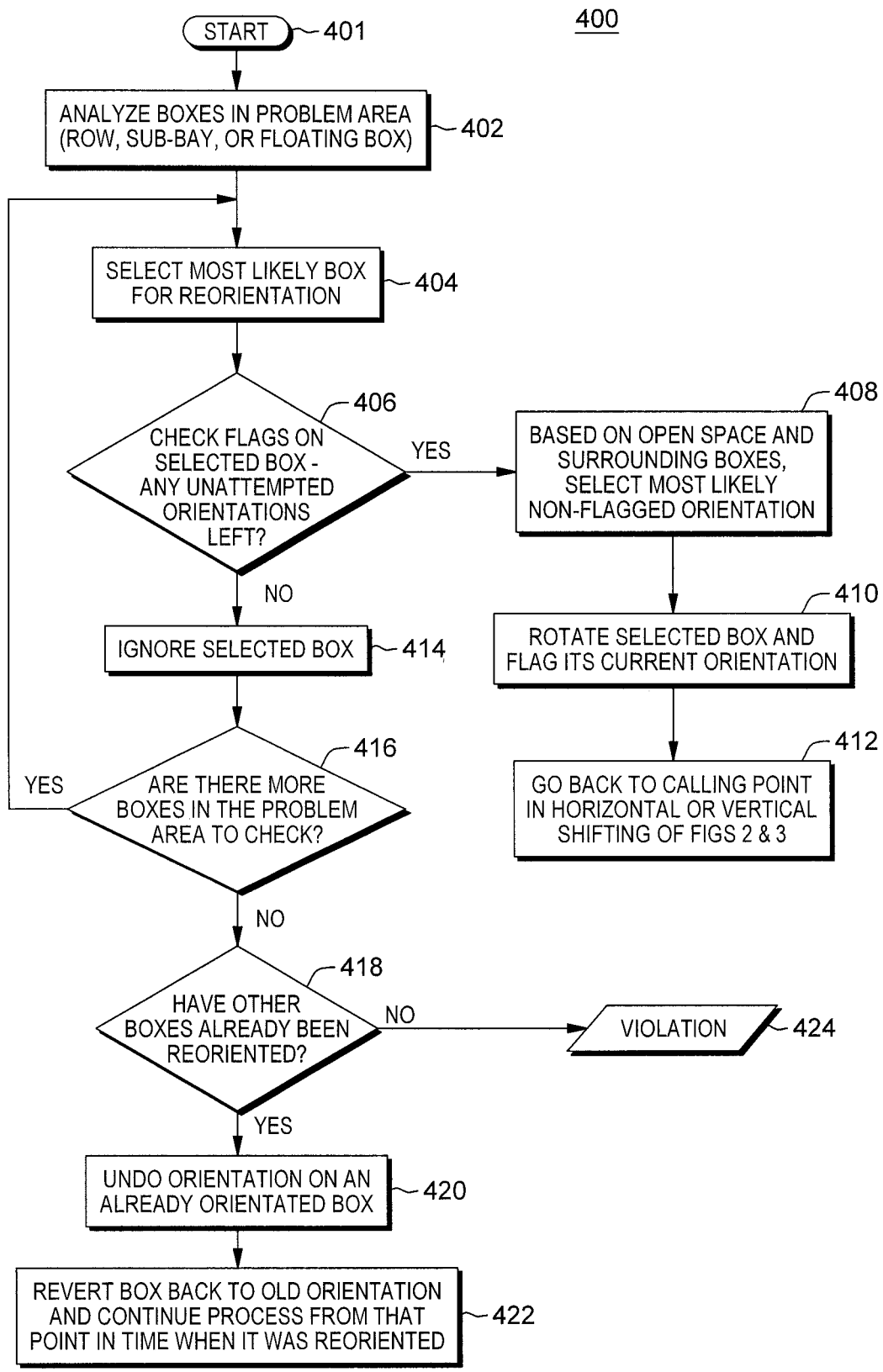
FIG. 4 depicts one embodiment of a process for reorienting a representation of a box in the storage bay during a mapping of boxes in the storage bay, such as depicted in FIGS. 1-3, in accordance with one or more aspects of the present invention.

For instance, as depicted in FIG. 1, the processing may determine whether there are any box placement violations within the storage bay 118. If "yes", then one or more boxes may be repositioned and/or reoriented. FIGS. 2-4 depict one example of processing for automatically repositioning boxes in the mapping of boxes, as well as selectively reorienting of boxes in the mapping of boxes within the storage bay.

Figure 6A:
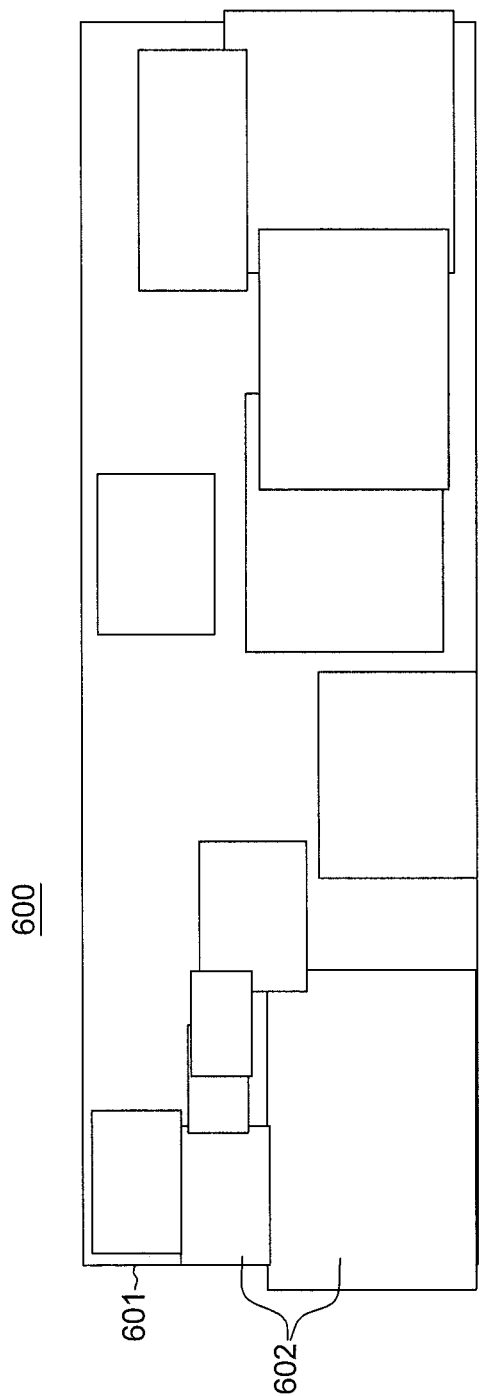
FIGS. 6A-6O depict one example of mapping boxes in a storage bay using processing, such as depicted in FIGS. 1-5I, in accordance with one or more aspects of the present invention.
Figure 6B:
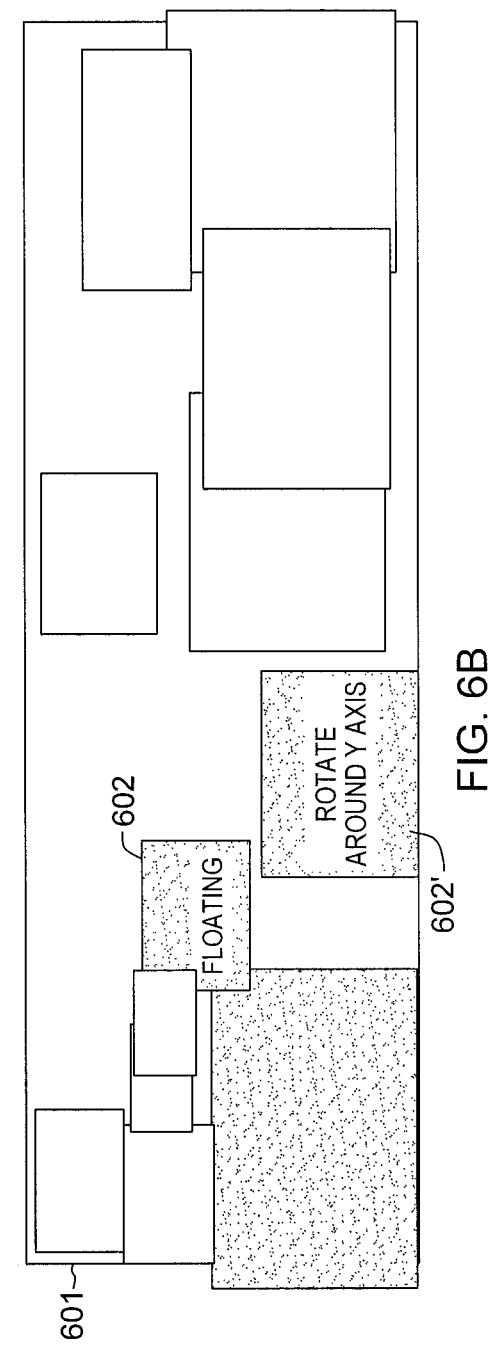

Referring first to FIG. 2, one embodiment of a process 200 for horizontal box shifting is depicted. This box shifting process 200 begins 201 with determining whether the mapping of boxes includes any floating boxes, or boxes with too much white space underneath 202. By way of example, FIG. 6A depicts one embodiment of an initial mapping of boxes 600 within a storage bay 601 containing multiple boxes 602, which may be of the same or different sizes. The mapping of boxes 600 in FIG. 6A may be created using, at least in part, the determined positions of the tags in the storage bay, as well as using the identifying information wirelessly read from the tags. As illustrated in FIG. 6B, a box 602 is identified as a floating box, or a box with too much white space underneath, and therefore from inquiry 202 (FIG. 2), processing proceeds to reorient a box 204.

One embodiment of a process 400 for box reorientation is depicted in FIG. 4. The process begins 401 with analyzing the boxes in the problem area, that is, the row, sub-bay, or floating box 402, and selecting the most likely box for reorientation 404. Processing checks flags on or associated with the selected box to determine whether there is any unattempted orientation change left 406. If "yes", then based on the open space and the surrounding boxes, a most likely non-flagged orientation is selected 408 to reorient the box. Processing rotates the selected box and sets the flag to its current orientation 410, and then returns to the point of call in the horizontal or vertical shifting processes of FIGS. 2 & 3, 412 (FIG. 4).

One embodiment of this process is depicted in FIGS. 6B & 6C, where a box 602' in the bottom row of boxes in the mapping of boxes 600 is selected and rotated about the y axis in order to provide support for the floating box 602 identified in FIG. 6B.

Continuing with box reorientation process 400 of FIG. 4, if all orientations have been attempted 406, then processing ignores the selected box 414, and determines whether there are any more boxes in the problem area to check 416. If "yes", then processing selects the next most likely box for reorientation. Otherwise, processing determines whether other boxes have already been reoriented 418. If "no", then a violation 424 is detected, representative of, for instance, insufficient or corrupted data. Assuming that other boxes have already been reoriented, then processing undoes the reorientation on an already reoriented box 420, reverting the box at issue back to the old orientation, and continues with the repositioning process of FIGS. 2 & 3 from the point in time when it was reoriented 422.

Figure 6E:
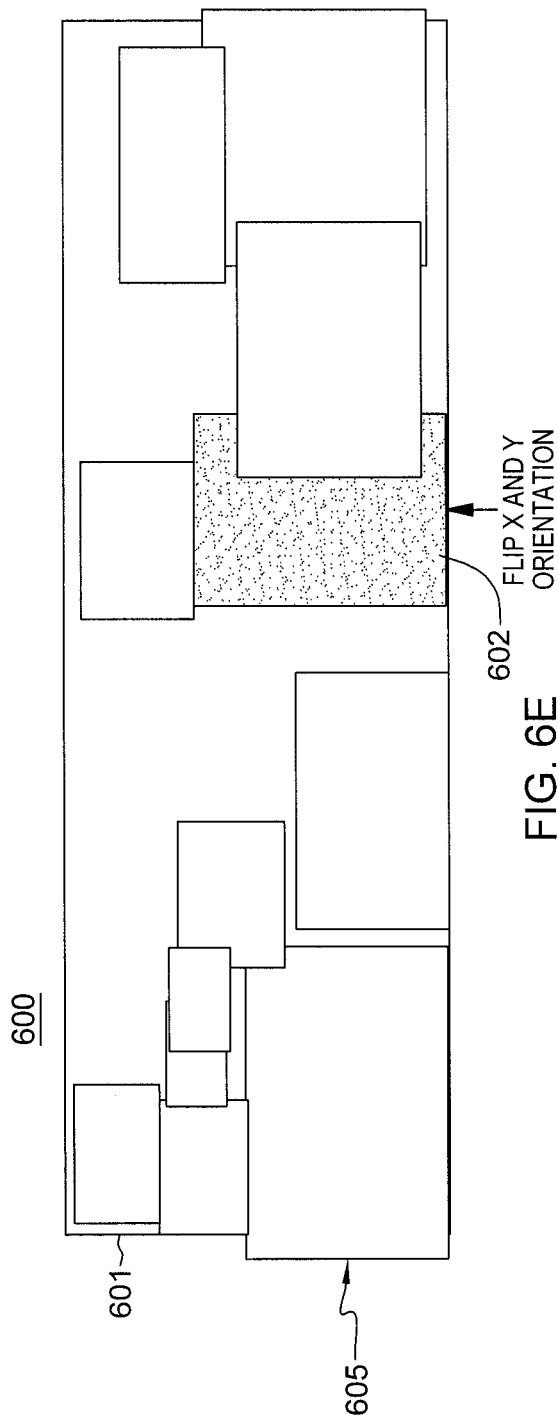
Figure 6F:
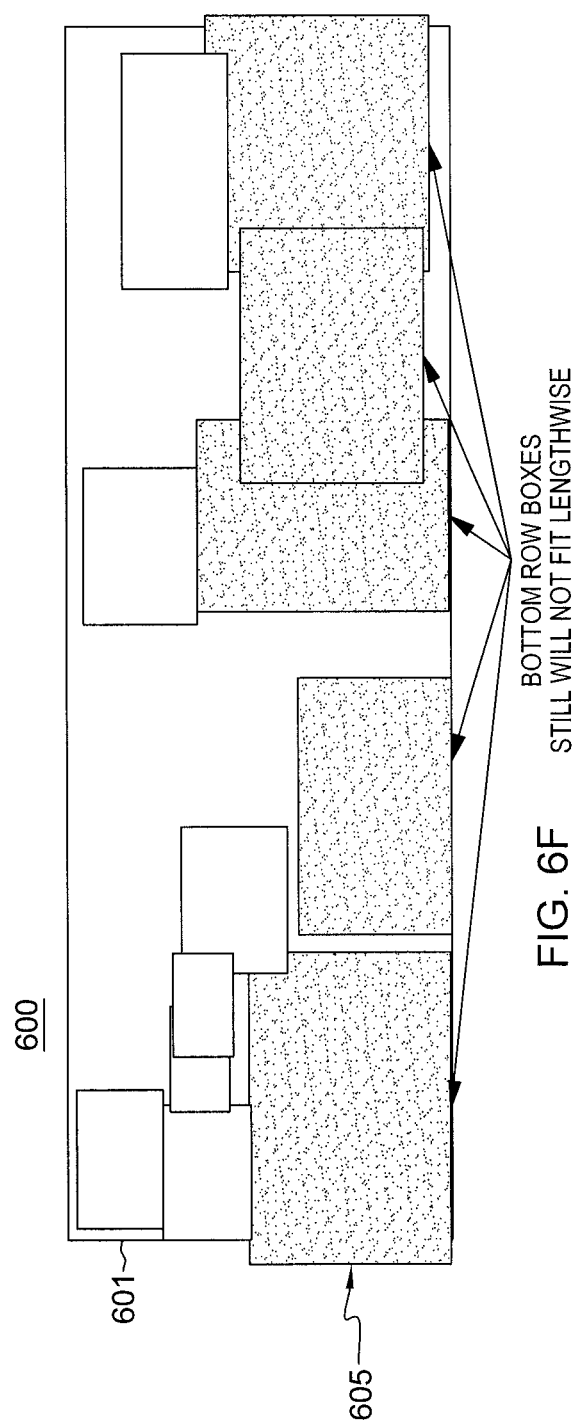
Figure 6O:
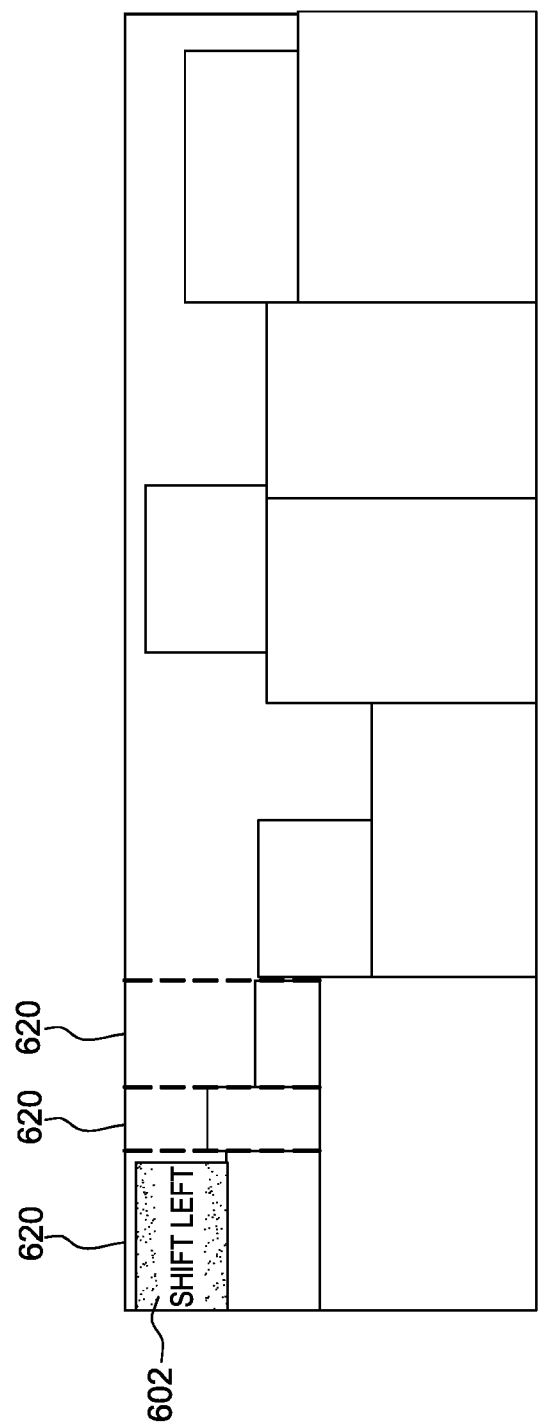

Returning to the process of FIG. 2, once any floating boxes or boxes with too much white space underneath are addressed, processing assumes the largest dimension for each box is in the z direction, that is, assuming that the box fits depth-wise within the storage bay, and that the next largest dimension of the box is oriented horizontally, that is, in the x direction in the example of FIGS. 6A-6O, if orientation is not otherwise specified or limited 206. Processing locates any boxes in the mapping of boxes in a bottom row of boxes with space under the box 208. One embodiment of this is depicted in FIG. 6D, where the three right-most boxes in the bottom row of boxes 605 are spaced above a bottom edge of the storage bay 601.

Returning to FIG. 2, processing determines if the assumed orientation fits in the storage bay length-wise 210. In the example of FIG. 6D, the boxes would not fit length-wise due, in part, to the overlapping of the three right-most boxes in the bottom row of the boxes 605. In this situation, a box is reoriented 212 (FIG. 2). FIG. 6E depicts an example of reorientation of the middle box 602 in the bottom row of boxes 605. After reorienting this box, processing in FIG. 2 returns to determine whether there are any other floating boxes or boxes with too much which space underneath 202. In a second pass through process 200, the second-from-right box 602 in the bottom row of boxes 605 is identified and reoriented as illustrated in FIGS. 6F & 6G by rotating the box about the z axis.

Once there is sufficient space for the boxes in the bottom row of boxes to fit in the bay length-wise, that is, horizontally across the bay, then processing shifts up or down the boxes in the bottom row of boxes to be level with a bottom edge of the storage bay 214 (FIG. 2). The updated intermediate mapping is depicted in FIG. 6H, where the bottom row of boxes 605 are shown aligned to the bottom edge of the storage bay 601.

Continuing with process 200 of FIG. 2, and by way of example only, processing may move right-to-left from the left edge of storage bay 601, and determine, starting at the left edge, whether the left-most box overlaps the left edge of the bay, or another box 216. If "yes", then the box is shifted to the right 218 and a link is created between the adjacent, overlapped boxes 220. In the example of FIG. 6G, the left-most box 602 in the bottom row of boxes 605 overlaps the side edge of storage bay 601, and is therefore moved to the right, and once moved, that box will overlap the second-from-left box 602 in the bottom row of boxes 605, resulting in the second-from-left box also being moved to the right to remove the overlap, resulting in a link, link 1, being created between the two left-most, adjacent boxes in the bottom row of boxes, as illustrated in FIG. 6H.

As shown in FIG. 2, processing may determine whether the last box in the row has been processed 222, and if "no", moves one box to the right, and determines whether the left edge of that box overlaps with an edge of the storage bay, or with another box. In the example of FIG. 6H, the answer is "no" with respect to the middle box 602 in the bottom row of boxes, and as such, there is no shifting of that box at this time.

As illustrated in FIG. 6H, as the two right-most boxes 602 in the bottom row of boxes 605 are processed, the overlap in those boxes results in those boxes being shifted right, and in the three right-most boxes being linked, in link 2. As shown, due to the right shift, the right-most box 602 now overlaps the right edge of storage bay 601. Once the first pass is completed, a second, right-to-left pass may be performed, treating the boxes in this example within the context of the links formed. Thus, returning to FIG. 2, once the last box in the row is processed 222, then moving right-to-left in the bottom row, does the right edge of the first link overlap with the edge of the storage bay, or with another box 226, and if "yes", the linked box group is shifted to the left 228 to avoid the overlap. As a result of this processing, the revised mapping of boxes in the bottom row of boxes 605 is depicted in FIG. 6I, where boxes in link 2 have been shifted to the left to fit link 2 within storage bay 601.

After moving the linked set, or if the linked set does not require movement, the process flow of FIG. 2 determines whether the first box in the row (that is, the left-most box in the example presented in FIGS. 6A-6O) is reached 230. If "no", then processing moves to the left to the next link 232 and determines whether for this link, the right edge of the link overlaps with an edge of the bay boundary, or with another box. Note that in this example of horizontal box shifting, movement from left-to-right initially, and then right-to-left, is presented by way of example only. In one or more other examples, processing could move from right-to-left, and then back from left-to-right initially, to achieve the same outcome. Once the first box in the row has been reached 230, then processing moves to vertical box shifting 234, one embodiment of which is depicted in FIG. 3.

As shown in FIG. 3, vertical box shifting process 300 begins 301 with determining whether there are now any floating boxes, or boxes with too much white space underneath 302. If "yes", then processing reorients the box at issue 304 and returns to the horizontal box shifting process of FIG. 2 for the box level or row containing the reoriented box 306.

Assuming that there are no floating boxes or boxes with too much white space underneath 302, then the storage bay is virtually divided into sub-bays based on a right edge of the organized boxes of a bottom row. One embodiment of this is depicted in FIG. 6J, where storage bay 601 is divided into vertical sub-bays 610 along imaginary right-edge cutoffs 611 of the boxes in the bottom row of boxes 605. As illustrated, where two boxes in the bottom row of boxes are at a same height, then the boxes may form a common vertical sub-bay 610. The intermediate mapping of FIG. 6J may be obtained by, for instance, again moving left-to-right across the bottom row of boxes, and determining whether the box is part of a linked set 308 (FIG. 3). If "yes", then as shown in FIG. 3, processing determines whether the multiple adjacent boxes have a same height 310. If "yes" again, then the vertical sub-bay starts from the last-sorted, vertical box edge on the left to the right edge of the right-most box in the linked set 312 with the same height. Otherwise, boxes are treated individually as not part of a linked set 314. If a box is not part of a linked set, then the vertical sub-bay starts from the last-sorted, vertical box edge on the left to the right edge of the box 316. Again, one embodiment of the resultant vertical sub-bays 610 and the vertical edges 611 of the sub-bays is depicted in FIG. 6J.

Returning to FIG. 3, processing determines whether any boxes cross a vertical cut-off line 318. If "yes", then the boxes at issue are shifted left or right into the vertical sub-bay that has more area within it. In the example of FIG. 6J, two boxes in the second row of boxes have been shifted right in the respective vertical sub-bays 610.

Continuing with FIG. 3, processing separately addresses boxes in each vertical sub-bay, and determines whether any more boxes are above already-placed boxes 322. If "yes", then processing determines whether the boxes in that column or sub-bay fit vertically within the storage bay based on current assumed orientations 334. If "no", a box is reoriented 338 using, for instance, the processing of FIG. 4. Otherwise, horizontal shifting is performed on the next row in each sub-bay 336. Applying horizontal box shifting to the left-most vertical column, and in particular, to the second row of boxes 615 in the left-most vertical sub-bay 610, orientation of the middle box is rotated about the z axis, as depicted in FIGS. 6K & 6L, in order to allow the second row of boxes to fit within the left-most vertical sub-bay 610, as shown in FIG. 6M. The process then repeats for any third row of boxes, fourth row of boxes, etc. For instance, upon forming vertical sub-bays above the second row of boxes in the left-most vertical sub-bay, the upper box 602 is initially shifted left since, as shown in FIGS. 6M & 6N, it would overlap the vertical edge of the next vertical sub-bay 620 containing that box. Further, applying the above-described processing, the box 602 is shifted up so as to not overlap the supporting box in the second row of boxes, resulting in the mapping of boxes 600 depicted in FIG. 6O.

Returning to FIG. 3, the process further determines, if there are no more boxes in the vertical sub-column above already-placed boxes 322, whether there are any violations that may still exist 340. If "yes", then a box is reoriented 338 using, for instance, the processing of FIG. 4, after which processing returns to the horizontal box shifting of FIG. 2 for the reoriented box level. If no violations exist, then the mapping of boxes in the storage bay may be output 342, for example, displayed.

Returning to the process of FIG. 1, once completing repositioning and reorienting of boxes within the mapping of boxes, processing determines whether a user wishes to confirm box placement is correct 122, and if "yes", allows a user to make adjustments 124 by, for instance, viewing the actual storage bay, and if necessary, reorienting or repositioning one or more boxes in the mapping of boxes to accurately represent the physical boxes, their orientation and positioning within the storage bay. Once completed, or if no manual confirmation is to be performed, the mapping of boxes is output, for instance, displayed, or otherwise saved or transferred as a data structure 126.

Figure 7A:
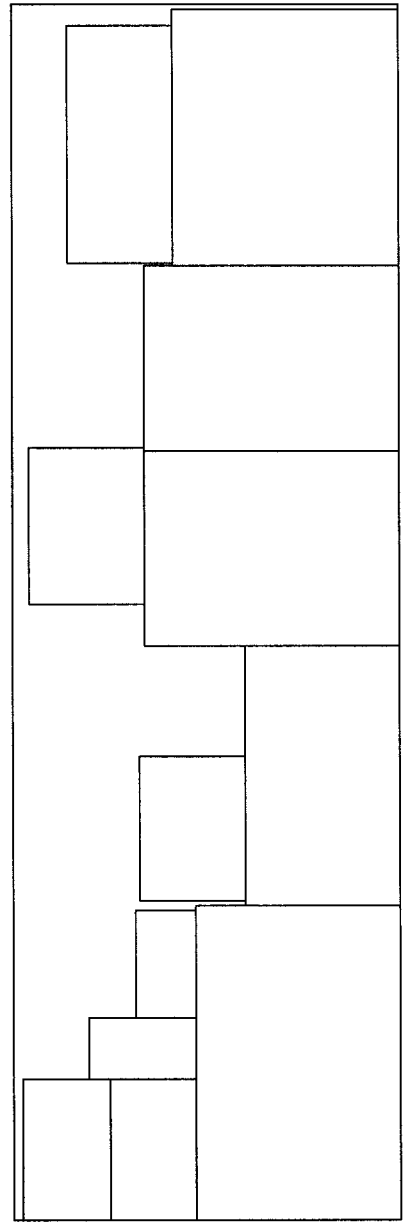
FIGS. 7A & 7B illustrate an optional adjustment step to an automatically determined mapping of boxes in a storage bay, in accordance with one or more aspects of the present invention.
Figure 7B:
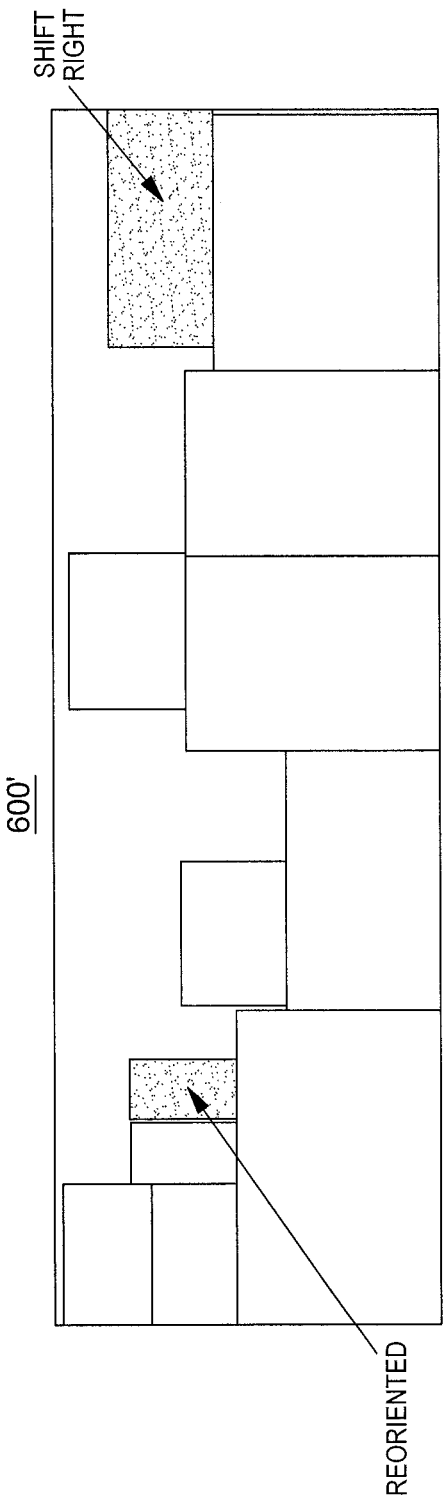

By way of example, FIGS. 7A & 7B illustrate the mapping of boxes 600 from the example of FIG. 6O. This mapping of boxes represents, in one or more examples, the best estimated mapping of the boxes. With this mapping, a user could, for instance, quickly scan the physical boxes in the storage bay and perform minor adjustments if the best estimated mapping of boxes is not perfect. For instance, a user could choose to rotate the orientation of one or more boxes, or shift one or more boxes left or right, as illustrated in the mapping of boxes 600' depicted in FIG. 7B, wherein one box 602 is reoriented, and another shifted slightly to the right. By way of further enhancement, one or more notifications could be provided to a user based on results of the mapping of boxes. For instance, if two NFC tags are considered too close together, the user could be notified to check whether the automatic mapping correctly placed the boxes, or if the boxes need to be adjusted in the mapping of boxes.

FIG. 8 depicts the initial mapping of boxes of FIG. 6A, and further depicts that each box 602 in the mapping includes two tags 800, for instance, an upper tag and a lower tag on opposite sides of the respective box. The provision of multiple tags, either on an exterior surface of the box, an interior surface, or otherwise within the box, may advantageously provide additional data points to allow more exact placement and orientation of the boxes in the mapping of boxes in the storage bay. More broadly, any number of tags could be associated with each box, as desired.

Figure 9:
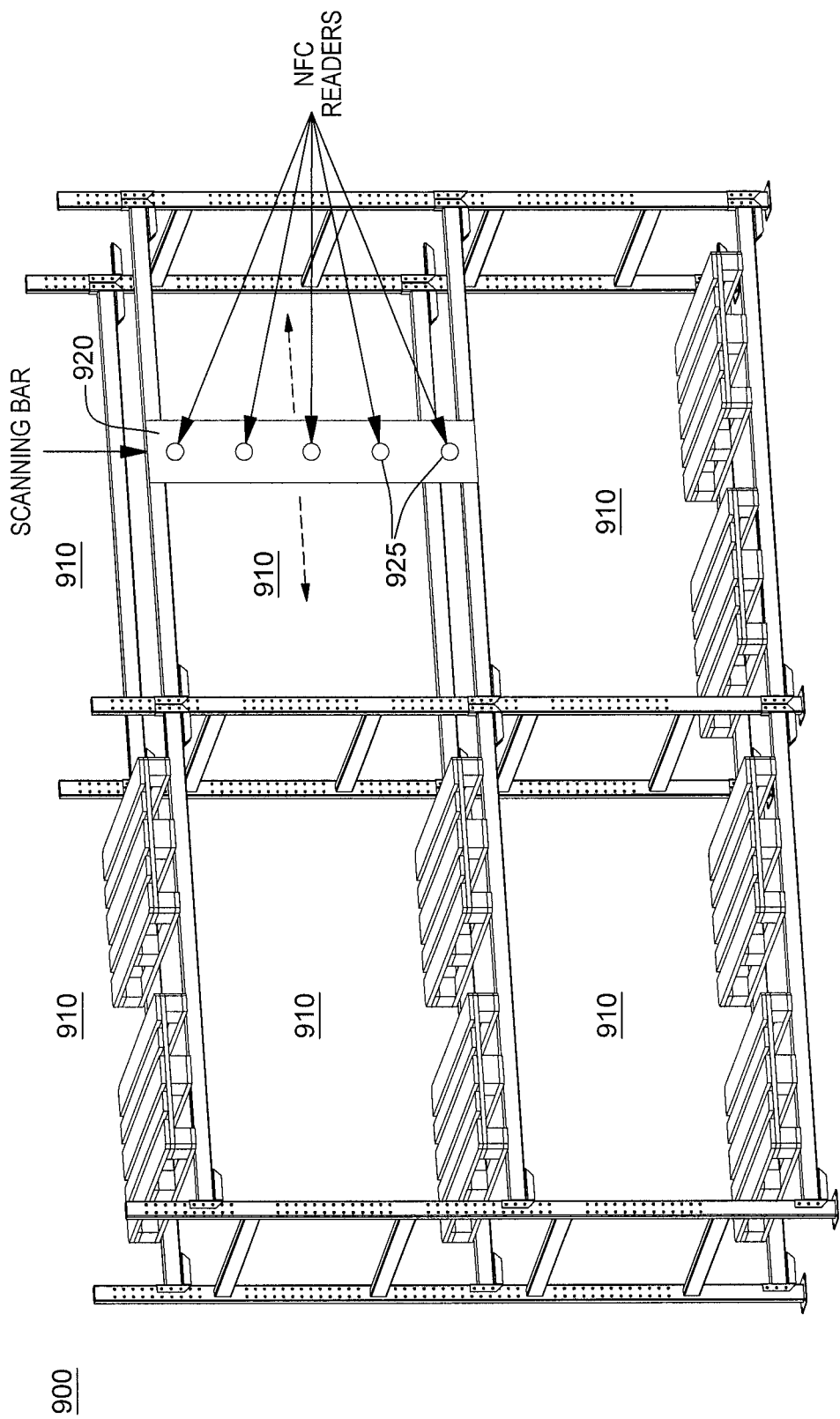
FIG. 9 illustrates an alternate embodiment of a process for wirelessly reading identifying information from NFC tags associated with boxes in a storage bay, in accordance with one or more aspects of the present invention.

By way of further example, FIG. 9 is a partial embodiment of a warehouse 900 comprising storage bays 910 from, for instance, a back side view of storage bays, and showing a scanning bar 920, which may support multiple wireless readers, such as multiple NFC readers 925 on the scanning bar. In one implementation, the scanning bar may reciprocate side-to-side to allow for scanning of, for instance, NFC tags disposed in boxes (not shown) within the associated storage bay(s) 910. For instance, a scanning bar 920 could be movably installed on the back side of each storage bay 910, and used in combination with, for instance, weight sensors to automatically scan the associated storage bay whenever a box is added, removed, or shifted within the storage bay. Note that the use of weight sensors could also be employed in combination with the processing described above in connection with FIGS. 1-6O, if desired.

As noted initially, in one or more other aspects, provided herein are computer-implemented methods, systems, and computer program products for assigning boxes to storage bays based on available spaces within the storage bays. Advantageously, the automated processing disclosed herein facilitates efficient use of available spaces within, for instance, multiple storage bays of a warehouse, a storage room, a retailer, etc.

Generally stated, in one or more aspects, the computer-implemented method may include: obtaining a first data structure identifying available spaces in multiple storage bays, the first data structure including xyz measurements of the available spaces, and the multiple storage bays including one or more boxes (such as one or more already-placed or already-assigned boxes). For instance, a mapping of boxes may be ascertained for one or more storage bays using an approach such as described above, then knowing the dimensions of the storage bay, a data structure of available spaces (such as available rectangular spaces) in the storage bay may be readily obtained, along with their xyz measurements. Note in this regard, that the process for assigning boxes as described hereinbelow is independent of any particular process used for mapping boxes within the storage bays. For instance, if desired, a mapping of boxes could be manually obtained and input into the system for use in automatically assigning boxes to storage bays, as described herein. Alternatively, the first data structure could be obtained by directly physically measuring available spaces within the multiple storage bays.

In addition, the computer-implemented method may include comparing, by a processor, for match xyz dimensions of a box with xyz dimensions of one or more available spaces in the first data structure of available spaces to identify a matching available space, where the box may be selected from a second data structure identifying boxes to be placed into the multiple storage bays; and assigning, based on a match, the box to the matching available space, and removing the box from the second data structure and the matching available space from the first data structure. In one or more implementations, the comparing and the assigning may be repeated for multiple boxes in the second data structure.

Note that as used herein, a box matches an available space if the dimensions of the box equal or are slightly less than the dimensions of the available space, such as within a defined tolerance. For instance, a box may match in one, two, or three dimensions an available space substantially exactly, or be slightly smaller in one or two of the dimensions than the available space, yet still be defined as matching in xyz dimensions if within the predefined tolerance. By way of specific example, the predefined tolerance may be that the respective box dimension is equal to or within a defined percent of the corresponding available space dimension. As a specific example, the box might "match" an available space in a particular dimension if the box equals the dimension, or is x % larger or smaller, for example, up to 10% larger or smaller, or 5%, etc. The tolerance for the box does allow for the box to be larger than the available space. For instance, where the dimension at issue is the z dimension, that is, the depth dimension into the storage bay, a "match" would be that the box equals or is within a defined tolerance of the z dimension depth of the bay. Also, where the z dimension of the available space is determined from the top surface of an already-placed box, then, the z dimension of the available space would be equal to the depth of the already-placed box. In this case, the current box being placed could have a z dimension slightly larger (or smaller) than the z dimension of the already-placed box, and still match the available space. The tolerance, as used herein, may be determined as desired for a particular application.

In one or more embodiments, the computer-implemented method may further include, where one or more dimensions of the box are smaller than the xyz dimensions of available spaces in the data structure of available spaces, comparing two dimensions of the box with two dimensions of the available spaces in the first data structure to identify the matching available space. By way of example, the two dimensions may be z and x dimensions, where the z dimension is the depth dimension into the storage bays, and the x dimension is a horizontal dimension across the storage bays. Note in this regard that, in certain embodiments, it may be assumed that the box is largest in the z dimension, and next-largest in the x dimension.

Where the comparing in two dimensions the box to the two dimensions of the available spaces results in a box matching multiple available spaces, then the box may be assigned to the matching available space with a third dimension that is larger than and most closely matching to the third dimension of the box. In one or more further embodiments, the comparing the two dimensions of the box with the two dimensions of the available spaces may include, where the box matches multiple available spaces in the two dimensions, assigning the box to the matching available space with an adjacent box having a third dimension that most closely matches the third dimension of the box. For instance, where the third dimension is the height of the box, the box may be assigned to the matching available space with an adjacent box in the storage bay that most closely matches the height of the box.

In one or more further embodiments, where the box does not match an available space in two dimensions, then the box may be compared in one dimension with one dimension of the available spaces in the first data structure to identify a matching available space in one dimension which also has a best-fit match to the box in a second dimension. In one or more examples, the one dimension may be, for instance, the z dimension, or depth dimension into the storage bay, and the second dimension may be the x dimension, or horizontal dimension across the storage bay.

In one or more embodiments, the comparing one dimension of the box with one dimension of the available space may include, where the box has multiple matching available spaces in the one dimension, and multiple similar best-fit matches in the second dimension, assigning the box to the matching available space which has a third dimension that is larger than, and most closely matching to, a third dimension of the box. Further, in one or more implementations, the comparing one dimension of the box with one dimension of the available spaces may include, where the box has multiple matching available spaces in the one dimension, and multiple similar best-fit matches in the second dimension, assigning the box to the matching available space with an adjacent box having a third dimension that most closely matches a third dimension of the box. By way of example, the third dimension may be a y dimension, with the y dimension being a vertical dimension within the multiple storage bays.

In one or more implementations, the computer-implemented method may further include, where one or more remaining boxes in the second data structure do not match an available space in the one dimension, reducing in the one dimension size of an available space in the first data structure to a longest length of a longest remaining box of the one or more remaining boxes in the second data structure, and repeating the comparing and the assigning.

As noted, in one or more embodiments, the assigning of boxes to available spaces in multiple storage bays may be linked with ordering of one or more products to be stored in the storage bays. For instance, the computer-implemented method may additionally include generating the second data structure based, at least in part, on ascertaining desired products to be stored, the desired products being within boxes, and the generating including identifying xyz measurements of the boxes which may be obtained; ordering one or more products of the desired products based on determining that one or more associated boxes of the one or more product(s) have a matching available space from the first data structure of available spaces.

As a further extension, in one or more embodiments, the computer-implemented method may include generating a third data structure including boxes without a current available space in the multiple storage bays, and for each box in the third data structure, an identification of one or more storage bays of the multiple storage bays which could be reorganized to provide an available space for that box. For instance, generating the third data structure may include, for each bay of the multiple storage bays: determining an open-front surface area in the bay; comparing each box to be included in the third data structure with the open-front surface area of the bay; and adding an identification of the bay to the third data structure for that box based on the open-front surface area for the bay being greater than a surface area of a smallest side of the box. Once the third data structure is assembled, it may be used to facilitate or prompt reorganization of one or more storage bays of the multiple storage bays in order to accommodate any boxes identified in the third data structure.

Still further, in one or more embodiments, computer-implemented methods, systems, and computer program products are provided which facilitate shifting of boxes between storage bays. By way of example, the computer-implemented method may include: identifying for a storage bay of multiple storage bays xyz dimensions of an available space in the storage bay; comparing, by a processor, for match xyz dimensions of a box in another storage bay with xyz dimensions of the available space in the storage bay; and generating a data structure including an identification of the box as able to be shifted into the storage bay to fill the available space. In one or more implementations, the generating may include only assigning the box to the data structure where shifting the box creates a larger available space in the another storage bay than the xyz dimensions of the available space in the storage bay filled by the shifting of the box into that available space.

Figure 10:
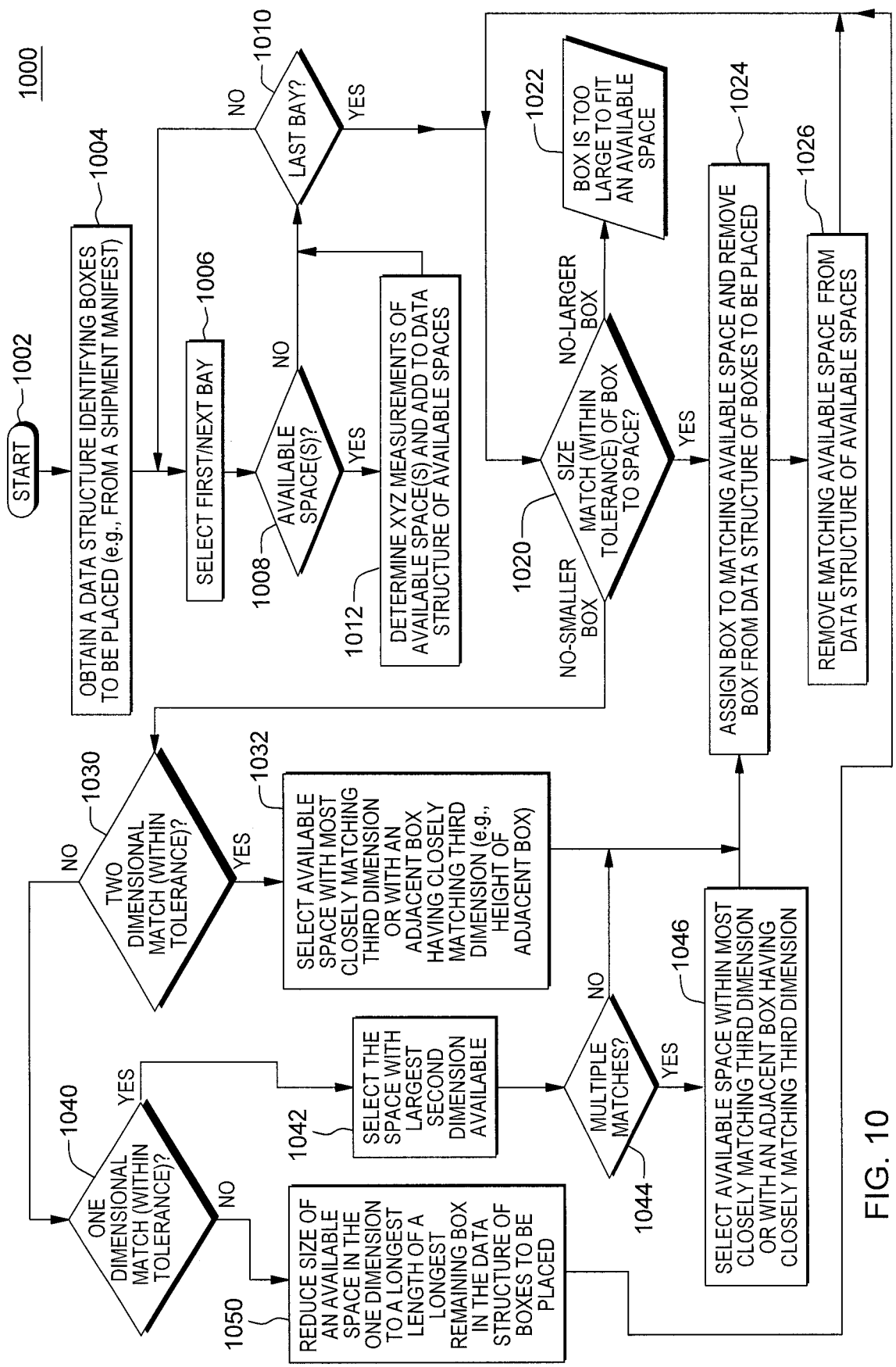
FIG. 10 depicts one embodiment of an automated process for assigning boxes to storage bays based on available spaces in the storage bays, in accordance with one or more aspects of the present invention.

By way of example, FIG. 10 depicts one embodiment of a computer-implemented method for efficiently assigning boxes to available spaces in multiple storage bays to efficiently place the boxes within the storage bays of, for instance, a warehouse, store room, retail establishment, etc. Referring to FIG. 10, process 1000 begins 1002 with obtaining a data structure identifying boxes to be placed 1004. For instance, the data structure, referred to herein as the second data structure, may be obtained from a shipment manifest identifying boxes received at a warehouse, along with their xyz dimensions.

Processing also determines or obtains another data structure, referred to herein as a first data structure, which identifies available spaces in the multiple storage bays. For instance, the first data structure may include xyz measurements of the available spaces, with the multiple storage bays already including one or more boxes. Note in this regard that the processing described herein would also accommodate the situation where the storage bay is empty at the start of the processing, with a single available space matching the xyz dimensions of the storage bay. In practice, however, the storage bay will typically already have one or more placed or assigned boxes within the bay. FIG. 10 depicts one embodiment for obtaining the first data structure, wherein processing considers a first or next storage bay 1006, and determines whether that bay has available space 1008. If "no", then processing determines whether the last bay has been evaluated 1010, and if "no", again returns to consider the next bay 1006. Assuming that available space exists within a bay, then processing determines xyz measurements of the available rectangular space(s), and adds the available space(s) and their xyz measurements to the first data structure 1012. By way of example, this may involve initially mapping boxes within the storage bays, and from the mapping of boxes within each storage bay, and the known dimensions of the storage bay, identifying available spaces and the dimensions of the available spaces.

Once the first data structure identifying available spaces in the multiple storage bays, including xyz measurements for the available spaces, and the second data structure identifying boxes to be placed, including xyz dimensions of the boxes are obtained, processing compares for match xyz dimensions of a box with xyz dimensions of one or more available spaces in the first data structure 1020. In one or more embodiments, the box being compared may be selected from the second data structure of boxes to be placed in the available spaces. If the box is larger than the available spaces, processing may signal that the box is too large to fit within an available space 1022, and if desired, flag the box for inclusion in a third data structure, obtained (for instance) as described below with reference to FIGS. 12A & 12B. As discussed below, the third data structure may be generated to facilitate reorganizing one or more storage bays to accommodate one or more additional boxes.

Assuming that the box matches xyz dimensions of an available space, that is, equals or has one or more dimensions within an acceptable, set tolerance, then the box is assigned to the matching available space, and removed from the second data structure 1024. Additionally, the matching available space is removed from the first data structure 1026. Processing then loops back to evaluate a next box in the second data structure 1020.

Should a box be smaller than the xyz dimensions of available spaces 1020, then processing compares two dimensions of the box with two dimensions of available spaces in the first data structure for a matching available space 1030. If the box matches multiple available spaces in two dimensions, then processing may select a matching available space with a third dimension that is larger than, and most closely matching to, the third dimension of the box, or assigns the box to the matching available space with an adjacent, already-assigned box having a third dimension that most closely matches the third dimension of the box 1032. The box may then be assigned to the selected matching available space, and removed from the second data structure 1024. In addition, the matching available space is removed from the first data structure 1026, and processing returns to select the next box from the second data structure to be compared for size match 1020. By way of specific example, the two dimensions may include the z dimension and the x dimension, with the z dimension being depth into the storage bay, and the x dimension being, for instance, the horizontal dimension across the storage bay. In such a case, the third dimension would be they dimension, or vertical dimension of the storage bay.

Assuming that the box does not match either three dimensions or two dimensions of available spaces in the first data structure, then the computer-implemented method checks for a one-dimension match between the box and the available spaces 1040. Note in this regard, that in one or more embodiments, the one dimension may be the z dimension into the storage bays. Assuming that there are multiple available spaces matching the box in the one dimension, then the available space with a largest second dimension, for instance, the x dimension, may be selected 1042, and if there are multiple available spaces with the same second dimension length 1044, then processing may select the available space with the most closely matching third dimension, or the space with an adjacent box having a closely matching third dimension 1046. After selecting a particular available space, processing assigns the box to the matching available space, and removes the box from the second data structure 1024, and the matching available space from the first data structure 1026, before returning to check a next box from the second data structure 1020.

Assuming that the box does not match in one dimension the available spaces in the first data structure, then size of an available space in the one dimension may be reduced to a longest length of a longest remaining box in the second data structure 1050, and processing returns to determine if there is a size match of a box to be placed to an available space in the data structure of available spaces 1020. Note that step 1050 is reached if there are no more perfect fits of a box in at least one dimension, and so, a dimension of one or more available spaces in the data structure of available spaces may be reduced to a length that equals the length of the longest remaining box in the data structure of boxes to be placed. After this, boxes continue to be placed as a result of the updates made to the recorded dimensions of the available space(s).

Figure 11:
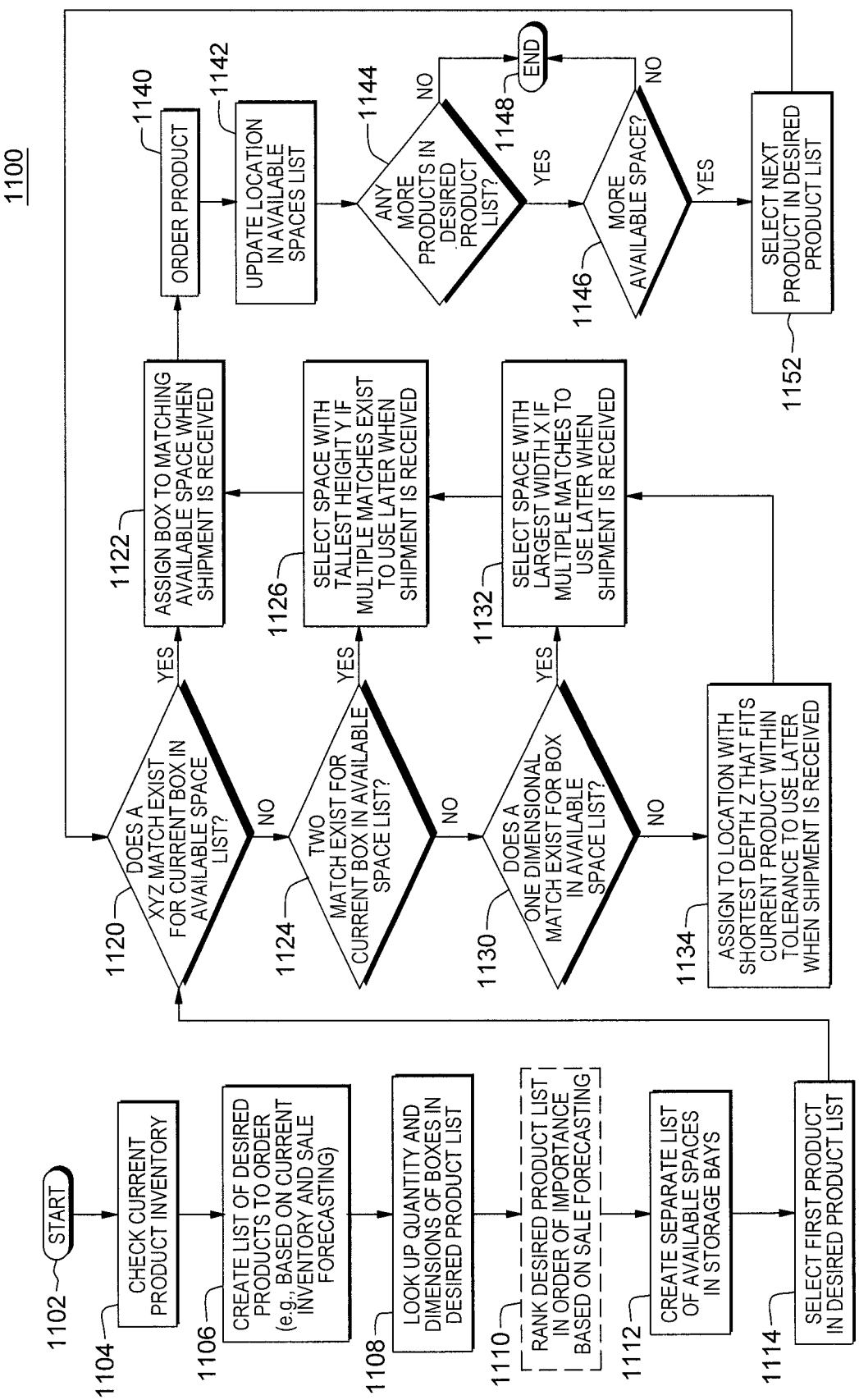
FIG. 11 depicts one embodiment of a process for linking ordering of product with evaluating ability to store product boxes into storage bays, in accordance with one or more aspects of the present invention.

By way of further example, FIG. 11 depicts one embodiment of a computer-implemented method for linking ordering one or more products with evaluating available space in one or more storage bays for storing the boxes containing the product. As illustrated, this process 1100 begins 1102 (in one embodiment) with checking current product inventory 1104, and creating a list of desired products to order 1106. The list of desired products may be based, for instance, on current inventory and anticipated sale projections. In one or more embodiments, processing may look up the quantity and dimensions of any boxes associated with the desired product list 1108. Optionally, the product list may be ranked with the products to be ordered by level of importance based, for instance, on sales forecasting 1110.

As depicted in FIG. 11, a separate list or data structure of available spaces in one or more storage bays to house the boxes is created 1112. The storage bays could be disposed, for instance, in a warehouse, a storage room, a retail establishment, or other location to temporarily store the product.

A first product is selected from the product list 1114, and processing determines whether there is a three-dimensional match between the associated box for that product and available space in the list of available spaces 1120. Assuming that the box matches xyz dimensions of an available space, that is, equals or has one or more dimensions within an acceptable, set tolerance, then the box is assigned to the matching available space to be used, for instance, when the product shipment is received 1122.

Should a box be smaller than the xyz dimensions of available spaces 1120, then processing compares two dimensions of the box with two dimensions of available spaces 1124. If the box matches multiple available spaces in two dimensions, then processing may assign the box to a location with a tallest height if multiple matches exist 1126. For instance, where the two dimensions are the z dimension, or depth into the storage bay, and the x dimension, or horizontal width across the storage bay, then the box is assigned to the location with the tallest y dimension, or vertical dimension, within the storage bay.

Assuming that the box does not match either three dimensions or two dimensions of available spaces, then the computer-implemented method checks for a one-dimensional match between the box and the available spaces 1130. Note in this regard that, in one or more embodiments, the one dimension may be the z dimension into the storage bays. Assuming that there are multiple available spaces matching the box in the one dimension, then the available space with the largest x dimension may be selected for later use when the shipment is received 1132. If a one-dimensional match does not exist for the box in the list 1130, then the box may be assigned to a location with a shortest depth z that fits the current product within tolerance for the user to use later when the shipment is received 1134. If there are multiple similar matches, then the box may be assigned to the available space with the largest width x for later use when shipment is received 1132. Further, if there are still multiple similar matches, then processing may assign the box to the available space with the tallest height y to use when shipment is received 1126.

Once the box has been assigned to an available space 1122, the product may be ordered 1140, and the available spaces list may be updated to, for instance, indicate an assignment of the matching available space 1142. Processing may determine whether there are any more products in the desired product list 1144, and if "yes", whether there are any more available spaces 1146. If there are either no more products in the product list, or available spaces in the available space list, then processing is complete 1148. Otherwise, processing obtains a next product in the desired product list 1152 for placement in an available space, and returns to determine whether the associated box for that product has an xyz match with an existing available space in the available space list 1120.

Note that in one or more embodiments, creating the list of available spaces in the one or more storage bays could be performed commensurate with or just prior to product ordering. Available spaces may be assigned an x-y dimension based on height and width of the space available without overlapping another box. A box may be stacked across two boxes if the underlying boxes are of the same height. A depth (z dimension) may be determined based on the depth of the storage bay for the boxes on, for instance, a bottom row. Alternatively, depth may be based on the depth of a box underneath an available space, that is, if not in the bottom row, within some tolerance. For instance, it may be determined that a box that is 1 inch longer than a box beneath it may be allowed.

As noted, in one or more enhanced aspects, the processing of FIG. 10 or the processing of FIG. 11 may be modified to include an optional prompt to reorganize one or more storage bays, such as when one or more boxes are too large to fit within an available space. Depicted with reference to FIGS. 12A & 12B is one computer-implementable process for generating a data structure, referred to herein as a third data structure, which includes boxes without a current available space in the multiple storage bays, and for each box in the third data structure, an identification of one or more storage bays of the multiple storage bays which could potentially be reorganized to provide an available space for that box.

Figure 12A:
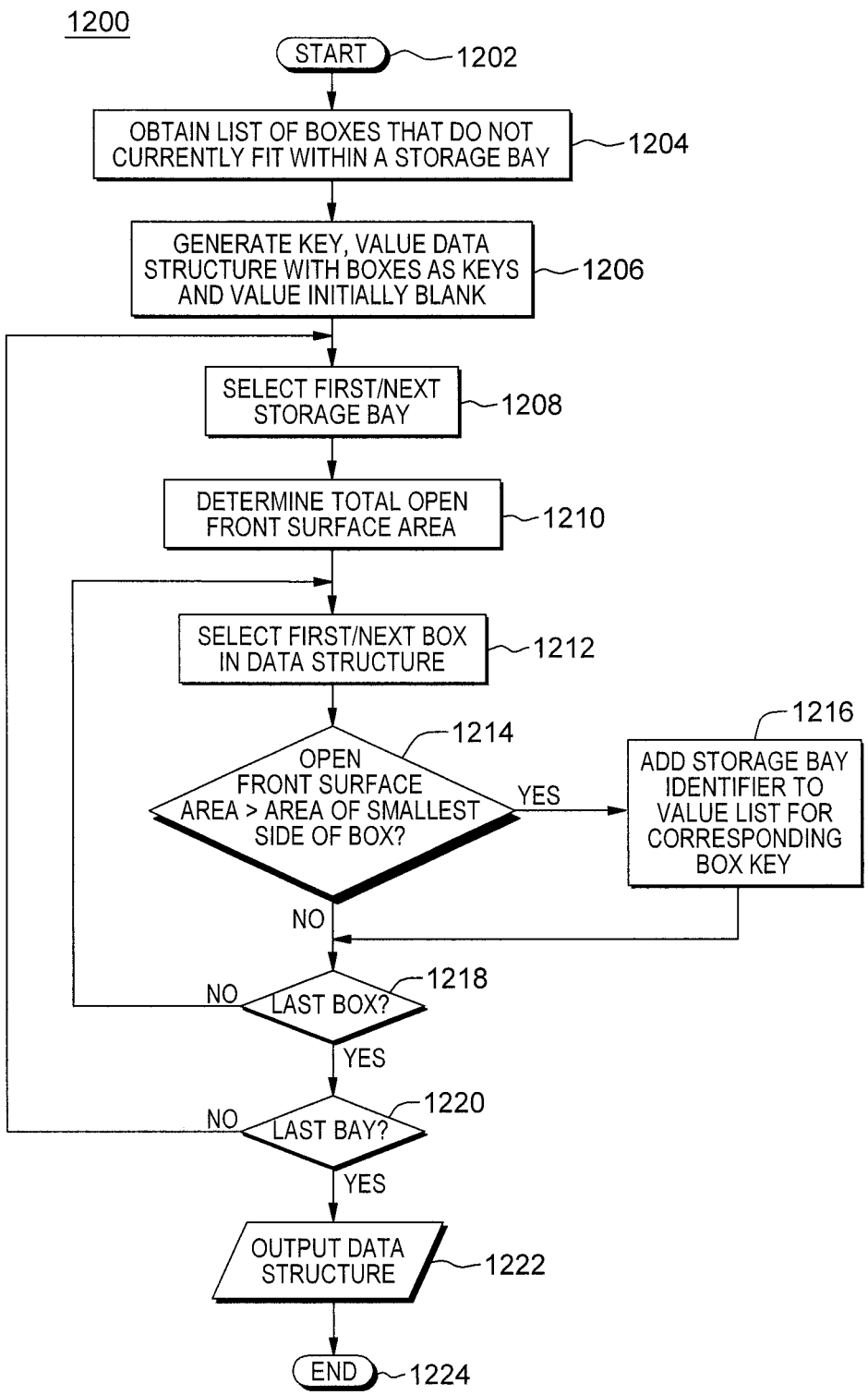
FIG. 12A depicts one embodiment of a reorganizing process which may be combined with, for instance, the processing of FIG. 10 or the processing of FIG. 11, wherein a data structure is generated identifying boxes currently without an available space in one or more storage bays, and identifying one or more storage bay locations which could be reorganized to accommodate the box, in accordance with one or more aspects of the present invention.

As illustrated in FIG. 12A, in one or more embodiments, the process 1200 begins 1202 with retrieving a list of boxes that do not currently fit into an available space in one or more storage bays 1204. This list could either be output from the process of FIG. 10, for instance, where a box is too large to fit within an available space 1022, or (for example) be derived from a list of products desired, which have yet to be ordered, due to insufficient available space in one or more storage bays to store the product once received using the process of FIG. 11.

In one or more embodiments, processing may create the third data structure by providing a list of boxes as keys, and an identification of storage bays which may be reorganized initially left blank 1206. The data structure is to be populated with identifications of storage bays that an operator should check for reorganization to accommodate the desired box. One embodiment of such a data structure is depicted in FIG. 12B, by way of example only.

Continuing with FIG. 12A, a first or next bay in, for instance, a warehouse, is selected 1208, and processing determines the total open-front surface area for that storage bay 1210. A first or next box in the list of boxes that do not currently fit into a storage bay is obtained 1212, and processing determines whether the open-front surface area of the bay is greater than the area of the smallest side of the box 1214. If "yes", then that storage bay's identifier is added to the third data structure for the corresponding box key 1216. Processing then determines whether the last box in the list of boxes has been processed for the current storage bay 1218, and if "no", repeats the process by obtaining a next box in the list of boxes that do not currently fit into the storage bays 1212. Once the last box has been processed, processing determines whether the last storage bay has been processed 1220. If "no", then processing returns back to select a next storage bay for consideration 1208. Once all boxes have been considered for each storage bay, then processing outputs the third data structure 1222, which completes the process 1224. Note that multi-bay reorganization could be explored if any box key has an empty list in the third data structure.

The output data structure (or third data structure) may be used as a suggestion of possible storage bays that an operator could check for reorganization in order to make room to accommodate a particular box. However, in practice, it may not be physically possible to reorganize an identified bay in a way that accommodates a desired box, since the above-noted process is based only on the amount of total open-front surface area versus the smallest area on one side of the box.

Figure 13:
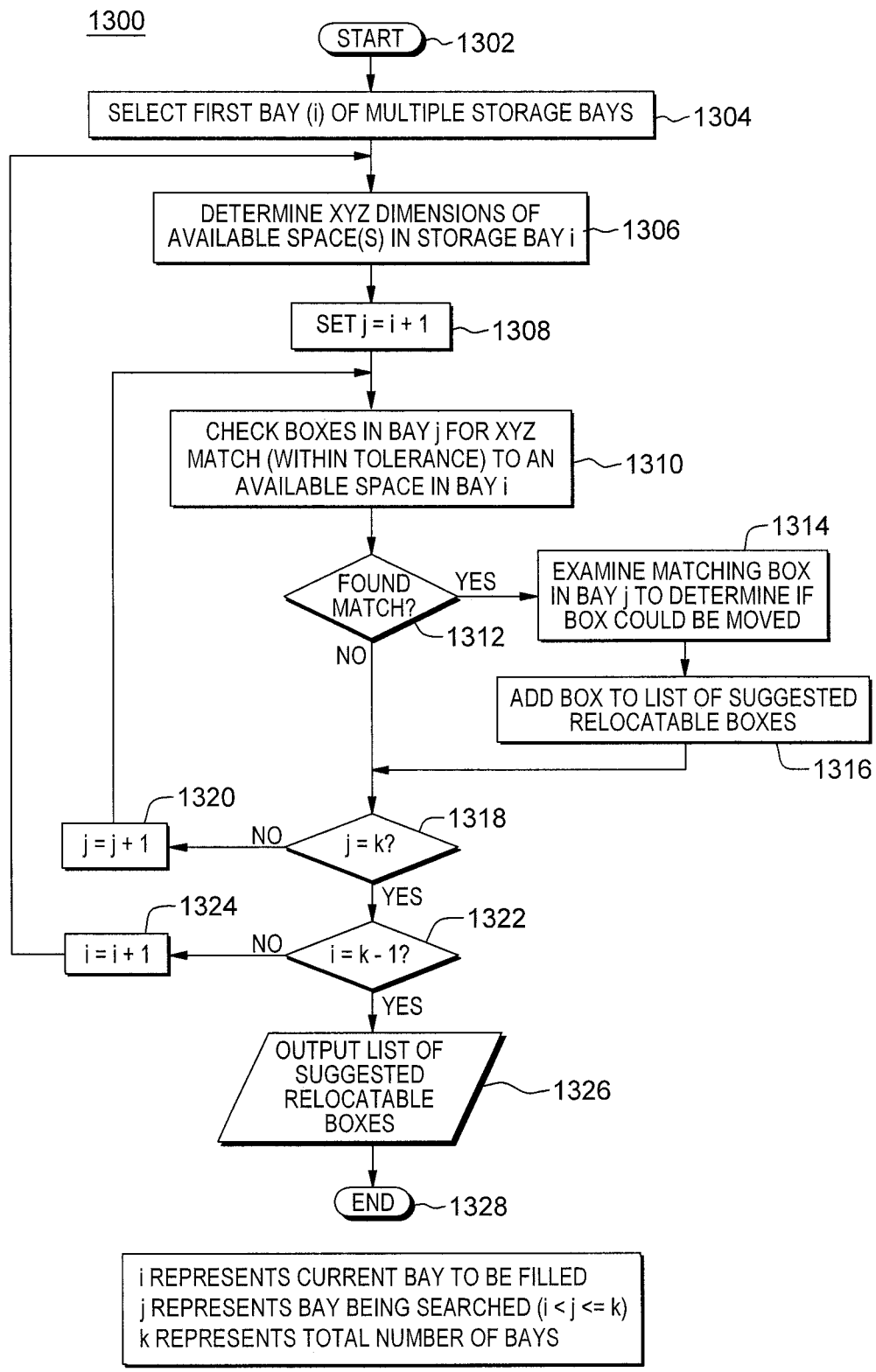
FIG. 13 depicts one embodiment of a process for generating a data structure to facilitate relocating boxes between storage bays in order to optimize use of available space within the storage bays, in accordance with one or more aspects of the present invention.

By way of further enhancement, a computer-implemented method, system, and computer program product are also provided herein for facilitating shifting of boxes between storage bays, in accordance with one or more further aspects of the present invention. One embodiment of a process 1300 for generating a list of suggested box shifts is depicted in FIG. 13. Process 1300 begins 1302 with selecting a first bay "i" of multiple storage bays "k" 1304. Processing determines xyz dimensions of available spaces in the current storage bay "i" 1306. A variable "j" is set equal to a next bay, such as the value of the current bay "i" to be filled plus one 1308, and processing determines whether any boxes in storage bay "j" are xyz matches for an available space in storage bay "i" 1310, and if a match is found 1312, then the matching box in storage bay "j" is evaluated to determine if the box should be identified for relocating to storage bay "i".

Note in this regard that a matching box in storage bay "j" may be analyzed by determining its position and evaluating the surrounding boxes. The box might only be added to the list of relocatable boxes if it creates a larger opening than the opening it is replacing in storage bay "i" and, for instance, it does not disturb the current storage bay "j" in a way that will need it to be restacked or reorganized. Assuming that it is determined that the box is relocatable, then the box is added to a list of suggested relocatable boxes 1316. Processing determines whether storage bay "j" represents the last storage bay (that is, j=k?) 1318. If "no", then the next storage bay is checked by incrementing value "j" 1320, and again checking the boxes in storage bay "j" for xyz matches (within tolerance) to an available space in the storage bay "i" 1310.

Once the next storage bay is the last storage bay of the multiple storage bays, that is, "j"="k", then processing determines whether storage bay "i" has reached the next-to-last storage bay "k−1" 1322. If "no", then the current storage bay "i" is incremented 1324, and processing returns to determine xyz dimensions of available spaces in that storage bay "i" 1306. Once all storage bays have been considered, the list of suggested relocatable boxes is complete, and may be output, saved, etc., 1326, which completes processing 1328.

Exemplary embodiments of a computing environment which may implement one or more aspects of the present invention are described below with reference to FIGS. 14-16.

Figure 14:
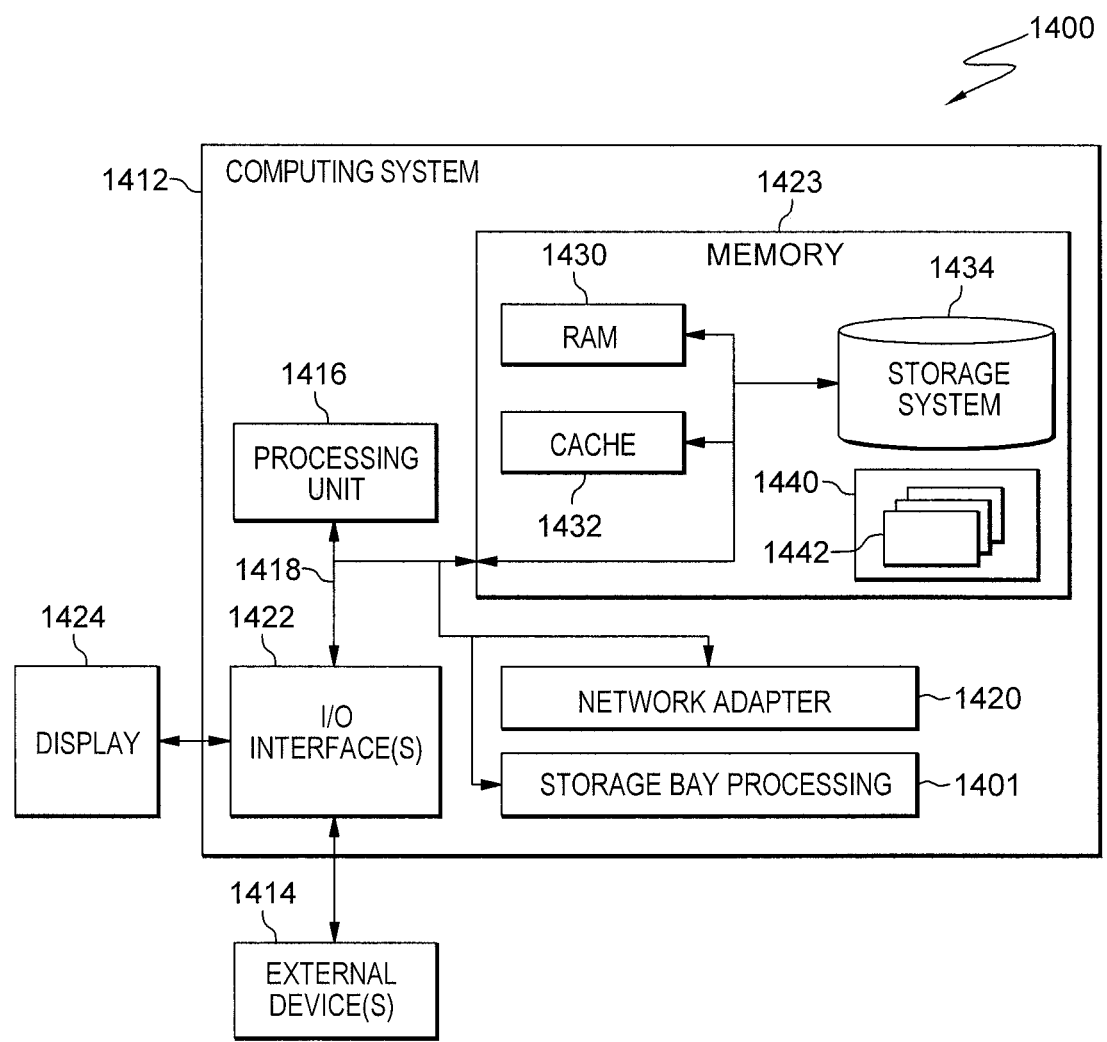
FIG. 14 depicts one embodiment of a computing system to incorporate or facilitate mapping processing, in accordance with one or more aspects of the present invention.

By way of further example, FIG. 14 depicts one embodiment of a computing environment 1400, which includes a computing system 1412. Examples of well-known computing systems, environments, and/or configurations that may be suitable for use as computing system 1412 include, but are not limited to, a wireless computer, a handheld or laptop computer or device, a mobile phone, a programmable consumer electronic device, a tablet, a personal digital assistant (PDA), and the like.

Computing system 1412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 14, computing system 1412, is shown in the form of a general-purpose computing device. The components of computing system 1412 may include, but are not limited to, one or more processors or processing units 1416, a system memory 1423, and a bus 1418 that couples various system components including system memory 1423 to processor 1416.

In one embodiment, processor 1416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1412 may include a variety of computer system readable media. Such media may be any available media that is accessible by computing system 1412, and it includes both volatile and non-volatile media, removable and non-removable media.

System memory 1423 can include computer system readable media in the form of volatile memory, such as random access memory (RAM) 1430 and/or cache memory 1432. Computing system 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1418 by one or more data media interfaces. As described below, memory 1423 may include at least one program product having a set (e.g., at least one) of program modules that are configured to carry out the functions of embodiments of the invention.

Program/utility 1440, having a set (at least one) of program modules 1442, may be stored in memory 1432 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein. Alternatively, a mapping and/or storage bay processing system, module, logic, etc., 1401 may be provided within computing environment 1412.

Computing system 1412 may also communicate with one or more external devices 1414 such as a keyboard, a pointing device, a display 1424, etc.; one or more devices that enable a user to interact with computing system 1412; and/or any devices (e.g., network card, modem, etc.) that enable computing system 1412 to communicate with one or more other computing devices. Such communication can occur via Input/Output (I/O) interfaces 1422. Still yet, computing system 1412 can communicate with one or more networks such as a local area network (LAN), a general wide area network (WAN), and/or a public network (e.g., the Internet) via network adapter 1420. As depicted, network adapter 1420 communicates with the other components of computing system, 1412, via bus 1418. It should be understood that although not shown, other hardware and/or software components could be used in conjunction with computing system 1412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 14. Computer system/server 1412 of FIG. 14 may be practiced in distributed cloud computing environments where tasks are performed by remote processing devices that are linked through a communications network. In a distributed cloud computing environment, program modules may be located in both local and remote computer system storage media including memory storage devices. Computer system/server 602 is capable of being implemented and/or performing any of the functionality set forth hereinabove.

Figure 15:
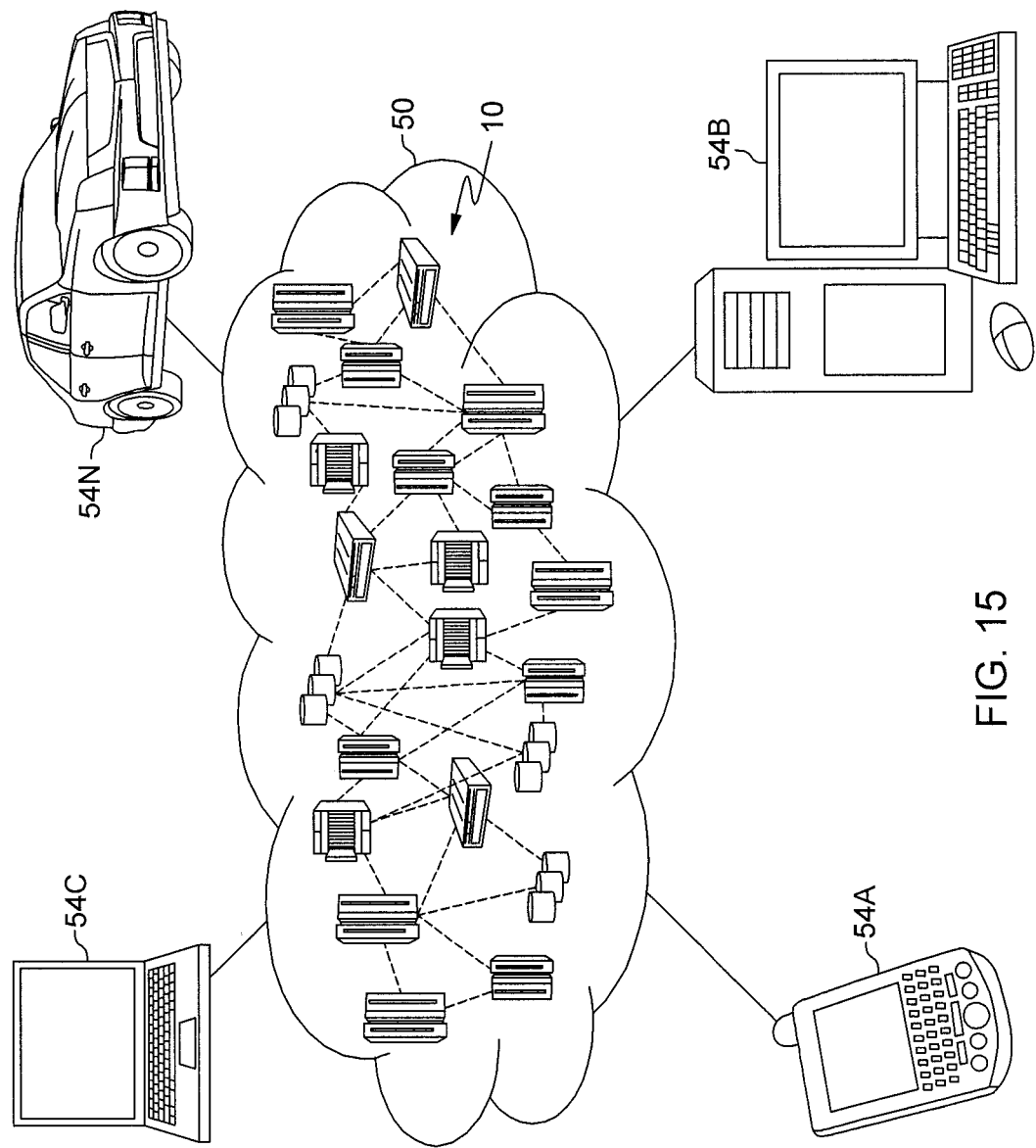
FIG. 15 depicts one embodiment of a cloud computing environment, which may implement, or be used in association with one or more aspects of the present invention.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
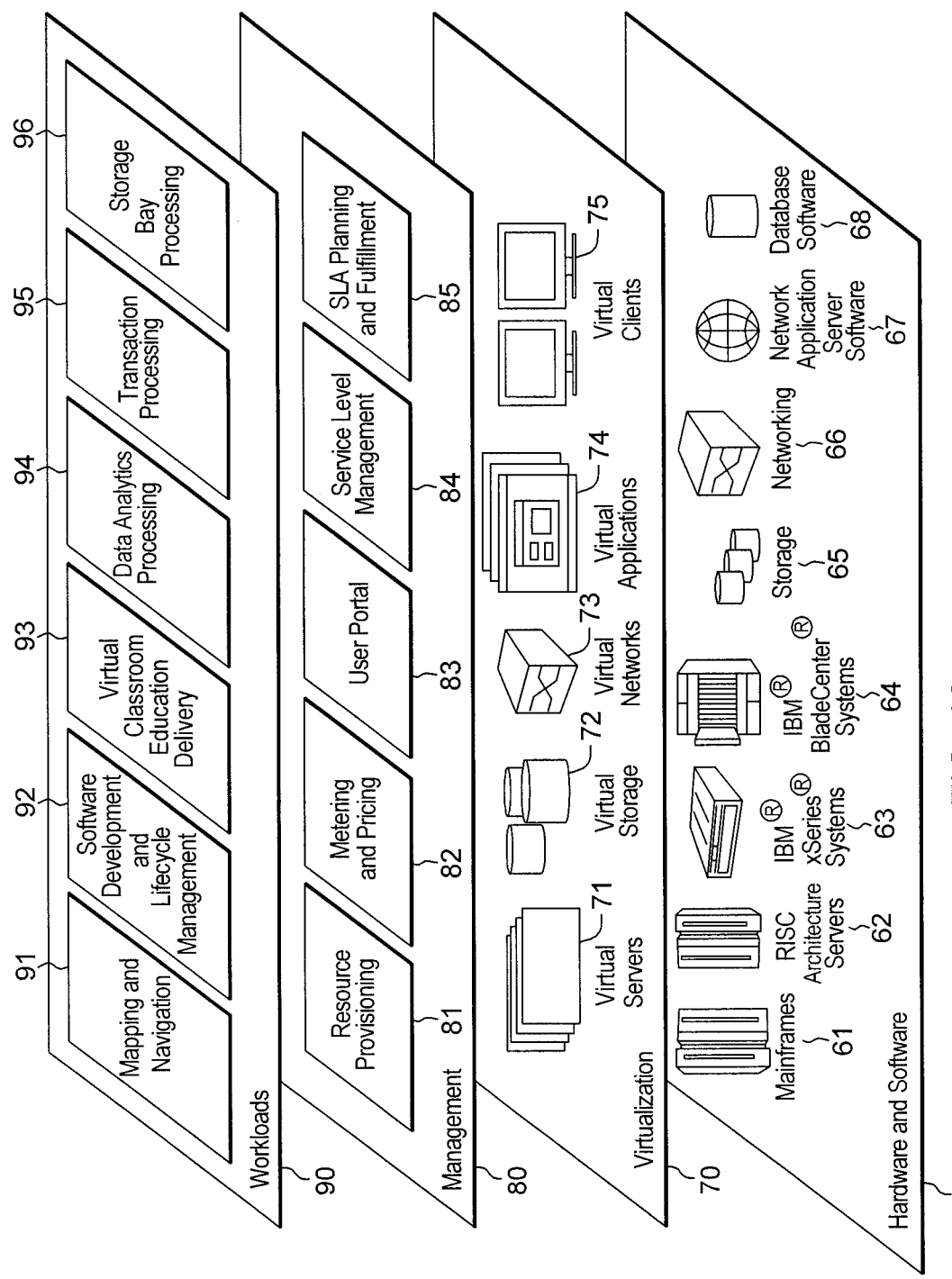
FIG. 16 depicts one example of extraction model layers, which may facilitate or implement a mapping process, in accordance with one or more aspects of the present invention.

Referring now to FIG. 16, a set of functional abstraction layers provided by cloud computing environment 50 is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mapping processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system comprising:
    a memory; and
    a processor communicatively coupled to the memory, wherein the system performs a method comprising:
        receiving identifying information wirelessly read, using a hand-held device, from tags associated with stored boxes in multiple storage bays of a warehouse;
        creating a first data structure using, in part, the identifying information wirelessly read from the tags using the hand-held device, the first data structure identifying available spaces in the multiple storage bays, and the first data structure comprising xyz measurements of the available spaces, the xyz measurements of the available spaces representing a sub-set of total space in the multiple storage bays for storing boxes;
        comparing, by the processor, for a match xyz dimensions of a box with xyz dimensions of one or more available spaces in the first data structure of available spaces to identify a matching available space, the box being selected from a second data structure identifying boxes to be placed into the multiple storage bays; and
        assigning, based on a match, the box to the matching available space to direct placing of the box in the matching available space in a storage bay of multiple storage bays for storing boxes, and removing the box from the second data structure and the matching available space from the first data structure.

2. The system of claim 1, further comprising repeating the comparing and the assigning for multiple boxes in the second data structure.

3. The system of claim 1, further comprising, where one or more dimensions of the box are smaller than the xyz dimensions of available spaces in the first data structure, comparing two dimensions of the box with two dimensions of the available spaces in the first data structure to identify the matching available space.

4. The system of claim 3, wherein the two dimensions are z and x dimensions, with the z dimension being a depth dimension into the storage bays, and the x dimension being a horizontal dimension across the storage bays.

5. The system of claim 3, wherein the comparing two dimensions further comprises, where the box matches in two dimensions multiple available spaces in the first data structure, assigning the box to the matching available space with a third dimension that is larger than and most closely matching to the box's third dimension.

6. The system of claim 3, wherein the comparing two dimensions further comprises, where the box matches in two dimensions multiple available spaces in the first data structure, assigning the box to the matching available space with an adjacent box having a third dimension that most closely matches the box's third dimension.

7. The system of claim 6, wherein the third dimension is a y dimension, with the y dimension being a vertical dimension with the multiple storage bays.

8. The system of claim 3, further comprising, where the box does not match an available space in two dimensions, comparing one dimension of the box with one dimension of the available spaces in the first data structure to identify a matching available space in one dimension which also has a best-fit match to the box in a second dimension.

9. The system of claim 8, wherein the one dimension is a z dimension, with the z dimension being a depth dimension into the storage bays, and the second dimension an x dimension, the x dimension being a horizontal dimension across the storage bays.

10. The system of claim 8, wherein the comparing one dimension further comprises, where the box matches in one direction multiple available spaces with multiple similar best-fit matches in the second dimension, assigning the box to the matching available space which has a third dimension that is larger than and most closely matching to the box's third dimension.

11. The system of claim 8, wherein the comparing one dimension further comprises, where the box matches in one dimension multiple available spaces with multiple similar best-fit matches in the second dimension, assigning the box to the matching available space with an adjacent box with a third dimension that most closely matches the box's third dimension.

12. The system of claim 11, wherein the third dimension is a y dimension, with the y dimension being a vertical dimension within the multiple storage bays.

13. The system of claim 8, further comprising, where one or more remaining boxes in the second data structure do not match an available space in the one dimension, reducing in the one dimension size of an available space in the first data structure to a longest length of a longest remaining box of the one or more remaining boxes in the second data structure.

14. The system of claim 1, further comprising:
    generating the second data structure based, at least in part, on ascertaining desired products to be stored, the desired products being within associated boxes; and ordering one or more products of the desired products based on determining that one or more associated boxes of the one or more products have a matching available space in the first data structure of available spaces.

15. The system of claim 1, further comprising:
generating a third data structure comprising boxes without a current available space in the multiple storage bays, and for each box in the third data structure, providing an identification of one or more storage bays of the multiple storage bays which could potentially be reorganized to provide an available space for the box.

16. The system of claim 15, wherein generating the third data structure comprises, for each bay of the multiple storage bays:
determining an open front surface area in the bay;
comparing each box to be included in the third data structure with the open front surface of the bay; and
adding identification of the storage bay to the third data structure for that box, based on the open front surface area of the bay being greater than a surface area of a smallest side of the box being listed in the third data structure.

17. A computer program product for assigning boxes to available spaces in multiple storage bays, the computer program product comprising:
a computer readable storage medium having program instructions embodied therewith, the program instructions being executable by a processor to cause the processor to:
receive identifying information wirelessly read, using a hand-held device, from tags associated with stored boxes in multiple storage bays of a warehouse;
create a first data structure using, in part, the identifying information wirelessly read from the tags using the hand-held device, the first data structure identifying available spaces in the multiple storage bays, and the first data structure comprising xyz measurements of the available spaces, the xyz measurements of the available spaces representing a sub-set of total space in the multiple storage bays for storing boxes;
compare, by the processor, for a match xyz dimensions of a box with xyz dimensions of one or more available spaces in the first data structure of available spaces to identify a matching available space, the box being selected from a second data structure identifying boxes to be placed into the multiple storage bays; and
assign, based on a match, the box to the matching available space to direct placing of the box in the matching available space in a storage bay of the multiple storage bays, and removing the box from the second data structure and the matching available space from the first data structure.

18. The computer program product of claim 17, further comprising repeating the comparing and the assigning for multiple boxes in the second data structure.

19. The computer program product of claim 17, further comprising, where one or more dimensions of the box are smaller than the xyz dimensions of available spaces in the first data structure, comparing two dimensions of the box with two dimensions of the available spaces in the first data structure to identify the matching available space.

20. The computer program product of claim 19, wherein the two dimensions are z and x dimensions, with the z dimension being a depth dimension into the storage bays, and the x dimension being a horizontal dimension across the storage bays.

* * * * *